(12) United States Patent
Gaur et al.

(10) Patent No.: US 11,461,844 B2
(45) Date of Patent: Oct. 4, 2022

(54) SYSTEMS AND METHODS FOR RECOMMENDING VEHICLE PRODUCTS, SERVICES, AND LOANS

(71) Applicant: Cox Automotive, Inc., Atlanta, GA (US)

(72) Inventors: Vishal Gaur, North Hills, NY (US); Mazen Letayf, North Hills, NY (US); Rahul Gupta, Atlanta, GA (US)

(73) Assignee: Cox Automotive, Inc., Atlanta, GA (US)

( * ) Notice: Subject to any disclaimer, the term of this patent is extended or adjusted under 35 U.S.C. 154(b) by 137 days.

(21) Appl. No.: 16/984,991

(22) Filed: Aug. 4, 2020

(65) Prior Publication Data

US 2021/0233164 A1    Jul. 29, 2021

Related U.S. Application Data

(63) Continuation-in-part of application No. 16/752,059, filed on Jan. 24, 2020, now Pat. No. 11,170,431.

(51) Int. Cl.
| | |
|---|---|
| *G06Q 30/00* | (2012.01) |
| *G06Q 40/02* | (2012.01) |
| *G06Q 30/06* | (2012.01) |
| *G06N 20/00* | (2019.01) |

(52) U.S. Cl.
CPC .......... *G06Q 40/025* (2013.01); *G06N 20/00* (2019.01); *G06Q 30/0627* (2013.01)

(58) Field of Classification Search
None
See application file for complete search history.

(56) References Cited

U.S. PATENT DOCUMENTS

| | | | | |
|---|---|---|---|---|
| 10,891,628 | B1* | 1/2021 | Flowers | H04W 4/029 |
| 2002/0049701 | A1* | 4/2002 | Nabe | G06Q 30/02 |
| 2004/0205019 | A1* | 10/2004 | Painter | G06Q 40/02 |
| | | | | 705/38 |
| 2005/0278249 | A1* | 12/2005 | Jones | G06Q 40/025 |
| | | | | 705/38 |
| 2008/0154791 | A1* | 6/2008 | Bannister | G06Q 40/025 |
| | | | | 705/36 R |
| 2008/0183616 | A1* | 7/2008 | Hankey | G06Q 40/00 |
| | | | | 705/38 |
| 2015/0081520 | A1* | 3/2015 | Brereton | G06Q 30/0201 |
| | | | | 705/38 |

* cited by examiner

*Primary Examiner* — Mila Airapetian
(74) *Attorney, Agent, or Firm* — Eversheds Sutherland (US) LLP

(57) ABSTRACT

This disclosure describes systems, methods, and devices related to predictive modeling for evaluating vehicles. A device may receive a customer identifier. The system may determine financial data associated with the customer identifier and vehicle data associated with a vehicle. The system may determine loan information associated with the customer identifier and the vehicle. The system may determine a product or service associated with the vehicle. The system may determine a first value indicative of a probability that the customer will purchase the vehicle and the product or service based on the loan information. The system may determine a second value indicative of a profitability of a purchase of the vehicle and the product or service based on the loan information. The system may determine respective indications of the vehicle, the product or service, and the loan information to a user device for presentation.

20 Claims, 11 Drawing Sheets

SYSTEMS AND METHODS FOR RECOMMENDING VEHICLE PRODUCTS, SERVICES, AND LOANS

CROSS-REFERENCE TO RELATED APPLICATIONS

This application is a continuation-in-part of U.S. patent application Ser. No. 16/752,059, filed Jan. 24, 2020, the disclosure of which is incorporated herein by reference.

TECHNICAL FIELD

This disclosure generally relates to systems and methods for recommended vehicle products, services, and loan details and, more particularly, to using machine learning models to evaluate and recommend vehicle products, services, and loan details.

BACKGROUND

Vehicle markets may be substantial. Finance and insurance (F&I) departments offering vehicle products or services contribute significantly to dealership profitability when properly managed and are a primary source of financial liquidity. As a result, many vehicle dealerships consider vehicle product or services sales important for maintaining the ability to conduct vehicle sales transactions.

BRIEF DESCRIPTION OF THE DRAWINGS

The detailed description is set forth with reference to the accompanying drawings, which are not necessarily drawn to scale. In the figures, the left-most digit(s) of a reference number identifies the figure in which the reference number first appears. The same reference numbers in different figures indicate similar or identical items.

DETAILED DESCRIPTION

Figure 1:
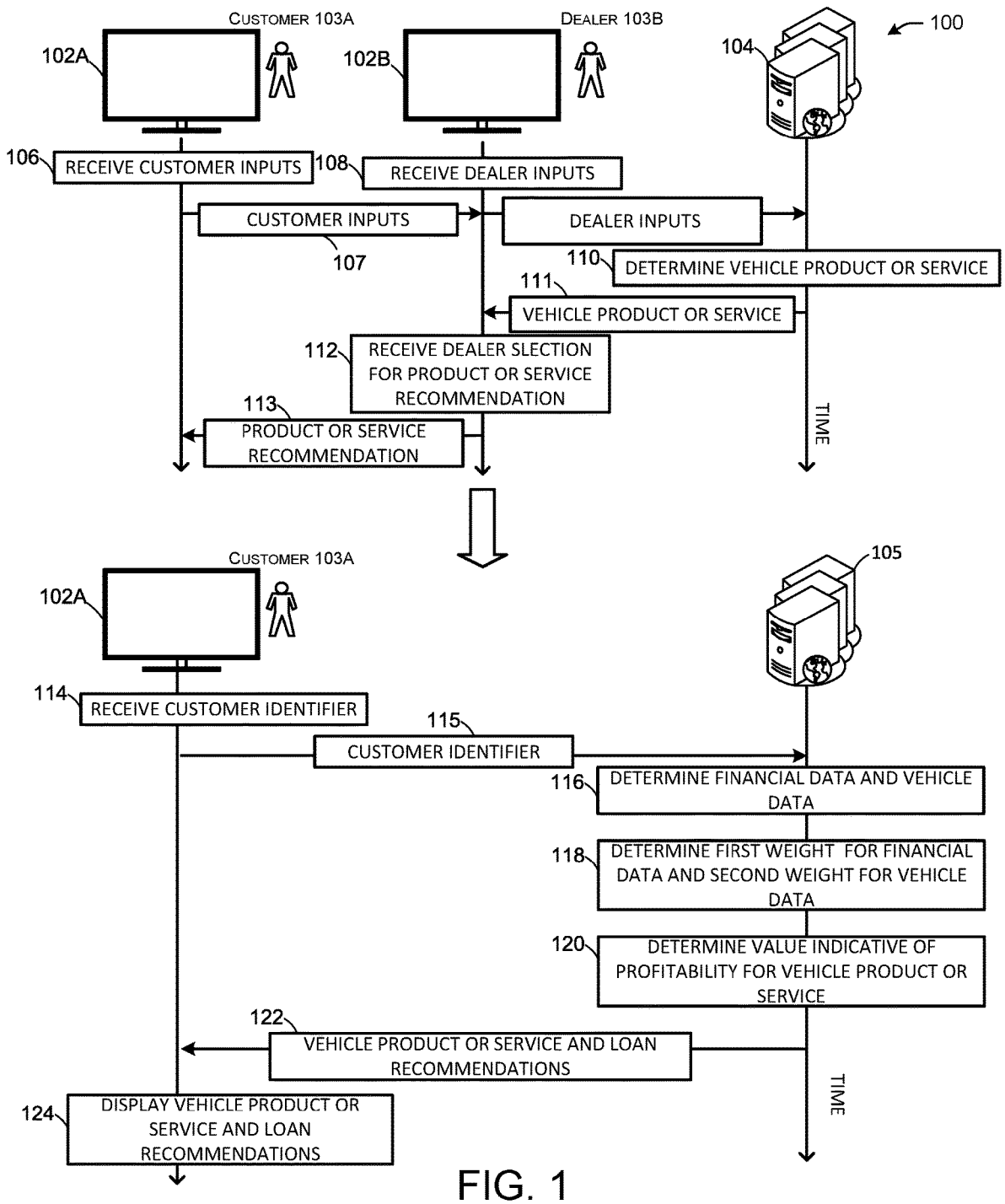
FIG. 1 illustrates an example process for vehicle product or service recommendation, in accordance with one or more example embodiments of the present disclosure.

Illustrative embodiments will now be described more fully hereinafter with reference to the accompanying drawings, in which some, but not all embodiments are shown. The disclosure may be embodied in many different forms and should not be construed as limited to the embodiments set forth herein; rather, these embodiments are provided so that this disclosure will satisfy applicable legal requirements. Like numbers refer to like elements throughout.

In vehicle sales, wholesale costs may rise, and retail prices may drop relative to the wholesale costs of vehicles, resulting in profit margin depression. Vehicle dealers may increase profitability of vehicle sales by selling vehicle products or services to customers, such as warranties, maintenance plans, vehicle protection plans, and the like. However, by offering such products or services, vehicle sellers may risk losing the potential sale of a vehicle to a customer who may be unlikely to purchase the recommended products or services in addition to buying or leasing a vehicle. For example, the customers may not be interested in the provided vehicle products or services, or may not be willing to spend more than a certain amount of money to purchase the products. Likewise, vehicle dealers may increase profitability of vehicle sales by charging more interest and/or principle for a vehicle loan, but may risk losing the vehicle sale by doing so. Some existing methods of determining recommended loans and vehicle products and/or services related to a purchase of a vehicle may not account for both the profitability and the likelihood that the user will purchase a vehicle and recommended products and/or services according to the loan terms that may be presented (e.g., offered) to a customer.

In addition, all decisions associated with vehicle product or service recommendations may be made by dealers (e.g., financial and insurance managers, sale managers, etc.), which may be affected by natural human bias and may not account for the most determinative factors in a customer's decision to purchase or not purchase a vehicle with a related product or service. For example, the dealers may recommend some vehicle products or services that customers may be less likely to purchase, due to a lack of knowledge of a customer's habits or finance. Dealers may find correlation between user characteristics and likelihood of purchasing a product, but may not be able to identify accurately causal relationships between user characteristics and vehicle purchases, and therefore may not consider the most likely factors which may cause a person to purchase a financial and insurance (F&I) product or service, such as the location of the consumer, the time of year, the weather, the person's income or credit, and the like.

Further, some vehicle product or service recommendations to customers may require significant time (and personnel) from the dealers, which makes the product or service sales time-consuming and inefficient. For example, the dealers may spend more than one hour evaluating products or services and customers' finance in a particular transaction. If any errors occur, the processing time may be extended. The customers may complete redundant documents in paperwork or online. Moreover, the customers may be required to provide many personal documents (e.g., driver's license, proof of insurance, form of payment, recent pay stubs, credit score, and history, etc.) to complete the documents.

Illustrative embodiments of the enhanced systems and methods described herein may generally be directed to, among other things, to automating and enhancing a computer-based decision-making process traditionally performed by dealers (e.g., F&I managers or sale managers) to account for limited user input, likelihood of user purchasing a vehicle product or service, and datasets that drive efficiency and profitability. For instance, given a limited user input (e.g., a user identifier), a computer system may predict a likelihood of user purchasing a product or service based on various datasets, and the computer system may recommend a product or service that will most likely result in a user purchase. The computer system may also determine one or more effective datasets that drive efficiency and profitability based on a correlation between the datasets and the recommended product or service. As such, without dealers recommending products or services, given a user identifier, a computer system may automatically and efficiently recommend products and/or services that will be most likely result in a purchase, thereby improving a computer's ability to recommend products and services that a consumer is most likely to purchase, removing human bias, efficiently increasing dealer profit, and improving overall customer experience.

Example embodiments of the present disclosure relate to systems and methods for using machine learning models to evaluate and recommend, to a customer (e.g., potential buyer), vehicles, vehicle products or services, and loans with which the customer may purchase a vehicle and a related product or service for the vehicle. The machine learning models may identify the factors that are most likely to cause a purchase to occur or not occur. For example, multiple customers wearing red shirts may purchase a particular make or model of a vehicle, but the red shirts may be a correlation rather than a causal factor in the customers' decisions to purchase a vehicle. The machine learning models may determine that the location of the customer (e.g., associated with a type of driving, weather, etc.), the financial information of a customer (e.g., what the customer may afford to purchase/borrow), and the like may be strong causal factors in the decision to purchase a vehicle and a related product or service. The type of product or service may be causally related to the type or price of a vehicle rather than the red shirt that a customer may wear, for example. In this manner, the machine learning models may evaluate a corpus of data that includes information about one or more users in one or more geographic areas, information about vehicles, information about vehicle purchases and loans, information about lenders, and the like to identify recommended vehicle products and services and recommended loan terms to present to a prospective vehicle buyer based on whether the recommendations are both profitable and are likely to result in a purchase. For example, the machine learning models may determine that a customer is likely to purchase a vehicle with a vehicle product or service at a monthly payment or interest rate up to a threshold amount, but likely to reject a deal when offered a monthly payment or interest rate that exceeds that threshold amount. Accordingly, the machine learning models may set loan terms based on a likelihood that a customer will purchase a vehicle according to the loan terms (e.g., based on any combination of information for the customer, the vehicle, lenders, etc.), and the machine learning models may determine which vehicle products or services to recommend to a customer based on factors identified as indicative that a product or service may be likely to be purchased by a particular customer.

More particularly, in some embodiments, a computer system using machine learning may receive a customer identifier (e.g., a user identification number, a social security number, driver license number, etc.). The computer system may determine financial data (e.g., a credit score, purchase history, etc.) associated with the user/customer identifier, and vehicle data associated with a vehicle (e.g., a vehicle that the customer has indicated an interest in, or a vehicle that the computer system may recommend to the customer). The computer system may determine loan information associated with the customer identifier and the vehicle (e.g., loan terms according to which the customer may purchase a vehicle and related product or service). The loan information may include an interest rate, price of the vehicle, monthly payment details, a payment term (e.g., number of months), one or more credit limits, a loan-to-value ratio, and/or any suitable information associated with loans for a customer with the customer identifier. The computer system may determine a product or service associated with the vehicle (e.g., a service contract, product warranty, etc.) to recommend to the customer (e.g., a recommended product or service to increase the profitability of the purchase of the vehicle, but that also satisfies criteria indicating that the customer is likely to purchase the recommended product or service with the vehicle).

The computer system may determine, using a machine learning model, a first value indicative of a probability that the customer will purchase the vehicle and the product or service based on the loan information (e.g., whether the user will accept offered loan terms for a particular purchase). The computer system may determine, a second value indicative of a profitability of a purchase of the vehicle and the product or service based on the loan information (e.g., a higher profitability with a higher interest rate, but possibly a lower probability of purchase with a higher interest rate). The computer system may determine that any recommended vehicle product or service for a purchase of a vehicle not only increases the profitability of a sale enough to recommend the product or service, but also does not render the possible purchase too unlikely. Once the computer system identifies the loan information and any recommended vehicle products or services, the computer system may send, based on the first value and the second value, a first indication of the vehicle, a second indication of the recommended product or service, and a third indication of the loan information to a user device for presentation (e.g., concurrent presentation of the loan information along with recommended products and/or services and/or the vehicle, or a presentation of the loan information associated with the vehicle and/or other suitable vehicles). In some embodiments, financial data may include loan information.

The computer system may receive a customer identifier (e.g., a user identification number, a social security number, driver license number, first/last name, phone number etc.). For example, the computer system may provide a graphical user interface (GUI) to a user (e.g., a customer, or a dealer) for inputting a customer identifier.

The computer system may determine financial data associated with the customer identifier and vehicle data associated with a vehicle. In some embodiments, the financial data and vehicle data may be from one or more databases of the computer system. In some embodiments, the computer system may send a request to a third-party system to retrieve the financial data and/or vehicle data. In some embodiments, the computer system may determine loan terms of a contract (both spot and traditional), estimating loan terms that, using machine learning, the computer system determines to be loan terms that the customer is likely to accept and that a lender is likely to accept.

In some embodiments, the computer system may provide instant deal structuring as the user changes the financial data and/or vehicle data. In other embodiments, the computer system may present or provide multiple financing options to provide the user with alternative options or deal structures. For instance, the computer system may allow the user to adjust the financial data (e.g., increasing or decreasing a down payment, or the like) and/or vehicle data, such as the make, model, and/or year of a vehicle that the user is considering purchasing. The system can also adjust its recommendations based on the consumer's explicit or implicit feedback. The computer system may provide, at or near real-time, an updated presentation of vehicle loan information and product or service recommendations.

The financial data may describe financial information associated with the customer identifier. Financial information may include personal information (e.g., birth date, current and past home addresses, phone numbers, and/or current and past employers, etc.), account information (e.g., credit cards, installment loans, mortgages or auto loans, etc.), public records (e.g., bankruptcies), and/or user characteristics (e.g., behavioral driving habit, a residency, age, gender, etc.). The financial data may include one or more datasets associated with one or more financial information. For example, the financial data may include a dataset associated with personal information, a dataset associated with account information, a dataset associated with user characteristics, and so forth. In some embodiments, the financial data may also be used to provide possible deal for the vehicle.

The vehicle data may describe vehicle information associated with a vehicle. The vehicle information may include one or more features (e.g., a make, a model, a year, a vehicle type, tire type, size, colors, sunroofs, extended cabs, four-wheel drive, number of engine cylinders, etc.), deals, features associated with the deals (e.g., deal type, expiration date, etc.), products or services (e.g., vehicles alone, product or services for vehicle protection, vehicle accessories, extended warranties, insurance, paint protections, etc.), local market information, geological location of dealers selling the vehicle, one or more dealer goals (e.g., increasing back-end gross profit, increasing profitability, etc.), inventory cost, customer incentives, dealer rebates, trade-in valuation, aftermarket products, dealer pay plans, cost of dealer-trade, floor-planning, or aged inventory. The vehicle data may include one or more datasets associated with one or more vehicle information. For example, the vehicle data may include a dataset associated with the features, a dataset associated with deals, a dataset associated with products or services, and so forth.

The computer system may determine loan information associated with the customer identifier and the vehicle. The loan information may include an interest rate, price of the vehicle, monthly payments, a payment term, one or more credit limits, a loan-to-value ratio, and/or any suitable information associated with vehicle loans for a customer. For example, the computer system may determine loan information based on the financial data associated with the customer identifier and vehicle data (e.g., based on the price of the vehicle and the customer's credit and/or purchase history, and the payment terms). As another example, the computer system may receive loan information from multiple lenders (e.g., loan offers) and may select a lender who offers the most profitable loan information that a customer is most likely to accept to purchase a vehicle and a product or service, as further described below.

In some embodiments, the computer system may generate contracts (both spot and traditional) with loan information that the computer system determines is likely to be accepted by a lender. The computer system may determine a probability that one or more lenders will approve and/or purchase the loan information, and may present the loan information to the customer before requesting approval of the loan information by a lender. The probability may describe a likelihood of the loan information approved and/or bought by the one or more lenders so that if the customer agrees to purchase the vehicle according to the loan information, the dealer may operate under the likelihood that a lender will agree to the loan information and provide the loan. For instance, loan information (e.g., an interest rate, a loan term, and/or any other suitable information associated with a loan) that the one or more lenders are most likely to approve and/or purchase may have a greater value than loan information that the one or more lenders are less likely to approve and/or purchase (e.g., a vehicle dealer may not want a customer to accept loan terms that a lender may not accept). In some embodiments, the computer system may determine a probability for any of one or more loans that one or more lenders will approve. The computer system may determine whether or not that the probability for any loan exceeds a probability threshold. A probability threshold may describe a value or a value range for determining whether or not lenders will approve and/or purchase loan information (e.g., using machine learning, and based on previous purchase data). If a probability of loan information exceeds a probability threshold, the probability indicates that one or more lenders are most likely to approve and/or purchase the spot contract. Additionally and/or alternatively, the computer system may determine whether or not that the probability associated with the loan information exceeds a profitability threshold. If a probability of a spot contract's loan information exceeds a profitability threshold, the vehicle dealer may determine that the loan is profitable enough to offer to a customer. The computer system may send the loan information to the one or more lenders once approved by a customer. The computer system may also selectively determine which lenders to which to submit the offer based on likelihood of approval of the offer. The computer system may receive an indication (e.g., a notification or the like) that the one or more lenders have approved and/or purchase the loan information, and may provide the lender's information to the customer.

In some embodiments, the computer system may identify one or more "book" estimates associated with a value of the vehicle, and use the book value to determine a recommended vehicle product or service, and/or to determine loan terms. For example, the computer system may determine an estimate value of the vehicle based on the vehicle data (e.g., a make, a model, a year, a vehicle type, tire type, size, colors, sunroofs, extended cabs, four-wheel drive, number of engine cylinders, historical data (e.g., maintenance and/or repair record, or the like). In some examples, the computer system may receive an estimate value from a database of the computer system and/or an external source (e.g., a Blue Book value that refers to a value of a vehicle by a guide known as the Kelley Blue Book).

The computer system may determine a recommended product or service associated with a vehicle for purchase. The product or service may include product or services for vehicle protection, vehicle accessories, extended warranties, insurance, paint protections, or any suitable product or service associated with a vehicle. In some embodiments, a product or service may include a vehicle. In some embodiments, the computer system may determine the product or service based on the vehicle data and/or financial data. For example, the computer system may determine that a vehicle may have deals for vehicle accessories (e.g., mud flaps or the like) based on the vehicle data including deals and features associated with the deals. The computer system may recommend mud flaps to the customer. In another example, a machine learning model may result in a determination that buyers of higher priced vehicles are likely to purchase a service contract, or that buyers in areas with significant winter weather may be more likely to purchase a vehicle warranty or four-wheel drive packages. In some embodiments, the computer system may determine multiple products or services associated with a vehicle to a customer. In some embodiments, the computer system may recommend the most profitable products or services that a customer will be most likely to purchase to the customer, as further described below.

The computer system may determine, using a machine learning model, a first value indicative of a probability that the customer will purchase the vehicle and the product or service based on the loan information. The first value may describe a likelihood of a customer accepting loan information to purchase the vehicle and the product or service. In some embodiments, first loan information may be more likely to be accepted by a customer than second loan information. For example, a lower monthly payment over a longer payment term as specified in the loan information may be more or less likely to be accepted than a higher monthly payment over a shorter payment term. The computer system may determine that the customer is likely or unlikely to accept any loan information before offering a loan to a customer, and may use machine learning to identify the factors that most strongly correlate to the probability that a customer may purchase a vehicle. Based on the factors that most strongly correlate to the probability that a customer may purchase a vehicle, the computer system may select products or services recommended for a vehicle purchase, and/or may determine loan terms based on what a customer may be approved to borrow and on whether the loan terms satisfy a profitability threshold.

In some embodiments, the computer system may utilize a machine learning model to determine loan term values based on loan information that was considered for other similar vehicles and/or for similar customers. In some embodiments, the computer system may determine a threshold interest rate based on previous purchases by the same customer for similar vehicles, previous purchases by similar customers for the same vehicle, and/or previous purchases by similar customers for similar vehicles. The threshold interest rate may be an interest rate above which a customer is unlikely to purchase a vehicle (e.g., the probability of the purchase using an interest rate above the threshold interest rate may fail to exceed a probability of purchase threshold), and below which the probability of purchase may satisfy a probability of purchase threshold.

When the computer system determines that interest rates are strong factors in determining the probability of purchase, the computer system may determine an interest rate to offer to a customer based on the rate for which the customer is approved and the likelihood that the customer will purchase the vehicle at the selected interest rate. For example, similar vehicles may have features that are similar to and/or the same as some or all of vehicle data of a vehicle that a customer is interested in. Features may include a make, a model, a year, a price, a vehicle type, tire type, size, colors, sunroofs, extended cabs, four-wheel drive, number of engine cylinders, deals, features associated with the deals, local market information, geological location of dealers selling the vehicle, one or more dealer goals, inventory cost, customer incentives, dealer rebates, trade-in valuation, aftermarket products, dealer pay plans, cost of dealer-trade, floor-planning, or aged inventory. Similar customers may include customers who have financial, demographic, and/or geographic information that are similar and/or the same as some or all of data of a customer whose vehicle purchase is being evaluated by the computer system. Financial information may include address information (e.g., current and past home addresses), employment information (e.g., current and past employers, etc.), account information (e.g., credit cards, installment loans, mortgages or auto loans, etc.), public records (e.g., bankruptcies), and/or user characteristics (e.g., behavioral driving habit, a residency, age, gender, etc.). The computer system may determine loan information associated with the similar vehicles and/or similar customers.

Based on historical data, the computer system may determine whether or not that loan information associated with similar vehicles have been accepted by the same customer and/or similar customers (e.g., purchases of similar vehicles by the same customer and/or similar customers, absence of purchases of similar vehicles by the same customer and/or similar customers). The computer system may determine a threshold value or range (e.g., a threshold interest rate, a threshold interest rate range, or the like) for determining whether or not loan information (e.g., interest rate, payment term, or the like) will be accepted by a customer. Loan information is less than or equal to the threshold value, or loan information exceeds the threshold range. The computer system may determine that a customer is most likely to accept the loan information. For example, an interest rate is less than or equal to a threshold interest rate. The computer system may determine that a customer is most likely to accept the interest rate. As another example, an interest rate is greater than the threshold interest rate. The computer system may determine that a customer is less likely to accept the interest rate. The computer system may adjust an interest rate to be less than or equal to the threshold interest rate. In some implementations, the computer system may take into account not just the gross profit, but also the overall profitability over time, and may adjust the interest rate down to target certain volumes or profitability goals. For example, the computer system may adjust an interest rate and/or vehicle value based on original equipment manufacturer (OEM) rebates and/or incentives. The computer system may reduce an interest rate and/or a price for a vehicle such that volumes of vehicles that are most likely to be purchased may meet an upcoming sales target and earn OEM rebates and/or incentives. In some embodiments, loan information may be an input for the machine learning model. In some embodiments, the financial data and the vehicle data may also be inputs to the machine learning mode. The machine learning model may generate respective weights associated with loan information, the financial data, and/or vehicle data. In some embodiments, the weights may be generated during training of the machine learning model. For instance, during training, the machine learning model may assign weights and/or bias to the loan information, the financial data, and/or vehicle data. The machine learning model may adjust weights in order to optimize a loss function or a cost function such that an error between an output of the machine learning model and an expected output is reduced. The weights may be proportional to the likelihood that a product or service, or information associated with a purchase, will influence the customer to purchase or not purchase a vehicle with a product or service. Using the red shirt example above, the red shirt of a customer may be weighted very low or at zero, whereas interest rates, vehicle type, financial information of the customer, and the like may be weighted higher. Higher weighted information may be evaluated for its impact on causing the profitability and likelihood of purchase to satisfy respective thresholds.

The computer system may determine a value indicative of a profitability of a purchase of the vehicle and the product or service based on the loan information. The value indicative of a profitability for a product or service including a vehicle may describe a likelihood of the product or service being profitable to account for a likelihood of a user purchasing the product or service, and/or a likelihood of achieving one or more dealer goals (e.g., increasing back-end gross profit, increasing front-end gross profit, etc.). In some embodiments, for instance, a product or service that a user is most likely to purchase and is most likely resulting in higher profit may have a greater value than a product or service that the user is most likely to purchase, but slightly increasing the profit (e.g., increasing the profit less than the other product or service), and a product or service that the user is less likely to purchase that has a high profitability may be less desirable to a customer than a product or service with a lower profitability (but still satisfying a profitability threshold) and a higher likelihood of being purchased. For example, a vehicle protection may cost more than a vehicle accessory. The computer system may determine that a customer is most likely to purchase a vehicle protection service and a vehicle accessory. The computer system may determine that a first profitability value associated with the vehicle protection and a second profitability value associated with the vehicle accessory. The first profitability being greater than the second profitability value may indicate that the vehicle protection service may generate more profit than the vehicle accessory, and/or in combination of some data associated with the customer (e.g., financial information, driving history, date/time, location, etc.) that may indicate that the user is more likely to purchase the vehicle protection plan, may be evaluated by the computer system to determine recommended vehicle products or services and loan terms for a purchase of a vehicle with the recommended vehicle products or services. For example, when the user lives in an area with significant winter weather or when the user has multiple accidents in a driving history, the user may be more likely to purchase the vehicle protection plan, and the vehicle protection plan may be more profitable to the seller.

In some embodiments, to determine the value indicative of a profitability, the computer system may determine a first weight for the financial data and a second weight for the vehicle data, the weights indicative of the respective correlations between the financial data and the profitability and probability of purchase, and between the vehicle data and the profitability and probability of purchase. Based on the weights, the computer system may use machine learning to determine which information is most likely to influence profitability and probability of purchase, and based on that information, may select recommended products or services, and loan information.

The first weight and the second weight may be associated with a second value indicative of a profitability for a product or service. A weight may indicate a strength of a correlation between data (e.g., financial data or vehicle data) and the second value. For instance, a greater weight may indicate that the data has a stronger correlation with the second value. A less weight may indicate that the data has a weaker correlation with the value. In some embodiments, a less weight may indicate that the data has a stronger correlation with the second value. A greater weight may indicate that the data has a weaker correlation with the second value. By adjusting the weights indicative of a strong correlation with the second value, the second value will be changed greatly. By adjusting the weights indicative of weak correlation with the value, the second value will be slightly changed or no significant change.

In some embodiments, a weight may include one or more sub-weights, each sub-weight indicative of a strength of a correlation between a dataset of the financial data or the vehicle data and the second value. For instance, a greater sub-weight may indicate that the dataset has a stronger correlation with the second value. A less sub-weight may indicate that the dataset has a weaker correlation with the second value. In some embodiments, a less sub-weight may indicate that the dataset has a stronger correlation with the second value. A greater sub-weight may indicate that the dataset has a weaker correlation with the second value. By adjusting the sub-weights indicative of a strong correlation with the second value, the second value will be changed greatly. By adjusting the sub-weights indicative of weak correlation with second value, the second value will be slightly changed or no significant change. As one example, the first weight associated with the financial data may include one or more sub-weights, and each sub-weight is associated with each dataset of the financial data, such as a first sub-weight associated with the first dataset, a second sub-weight associated with the second dataset, a third-sub-weight associated with the third dataset, and so forth. As another example, the second weight associated with the vehicle data may include one or more sub-weights, and each sub-weight is associated with each dataset of the vehicle data, such as a first sub-weight associated with the fifth dataset, a second sub-weight associated with the sixth dataset, a third-sub-weight associated with the seventh dataset, and so forth. In some embodiments, a weight may be a combination of sub-weights. For example, a weight can be a sum of the sub-weights.

In some embodiments, the computer system may determine the first weight and the second weight based on the machine learning model described above. For instance, the financial data and vehicle data may be an input for the machine learning model. The machine learning model may generate respective weights and sub-weights associated with the financial data and vehicle data. In some embodiments, the weights and sub-weights may be generated during training of the machine learning model. For instance, during training, the machine learning model may assign a sub-weight and/or bias to each dataset of loan information, financial data, and/or vehicle data. The machine learning model may adjust each sub-weight in order to optimize a loss function or a cost function such that an error between an output of the machine learning model and an expected output is reduced.

In some embodiments, the machine learning model may include one or more supervised machine learning models, one or more unsupervised machine learning models, one or more neural networks (e.g., deep neural networks) or any other multi-layer non-linear models. A neural network may include a recurrent neural network (e.g., a long short-term memory recurrent neural network), a feed-forward neural network, or any other form of a neural network.

In some embodiments, the machine learning model may be included in or otherwise stored and implemented by a user device such as a laptop, tablet, or smartphone. As yet another example, the machine learning model may be included in or otherwise stored and implemented by a server that communicates with the user device according to a client-server relationship. For example, the machine learning model may be implemented by the server as a portion of a web service. In some embodiments, the machine learning model may be received from the server over a network, stored in a memory of the user device, and used or otherwise implemented by one or more processors of the user device.

In some embodiments, the computer system may train the machine learning model using various training or learning techniques, such as, for example, backwards propagation of errors. In some embodiments, performing backwards propagation of errors may include performing truncated backwards propagation through time. The computer system may perform a number of generalization techniques (e.g., weight decays, dropouts, etc.) to improve the generalization capability of the machine learning model being trained.

In particular, the computer system may train the machine learning model based on training sets. The training sets may include, for example, previous purchases for the same customer to buy similar vehicles, previous purchases for similar customers to buy similar vehicles, previous purchases for similar customers to buy the same vehicle, and/or feedback measurement indicative of purchases associated with the product or service. In some embodiments, the computer system may train the machine learning model using the first value and/or the second value. As one example, the computer system may determine that the second value is greater than the profitability threshold, and determine that the product or service has been purchased by the user. The computer system may determine an adjustment to further refine one or more sub-weights indicative of a strong correlation between datasets associated with the one or more sub-weights and the associated value. The computer system may generate an adjusted machine learning model based on the adjusted sub-weights. As another example, the computer system may determine that the second value is less than the profitability threshold of the product or service. The computer system may further determine that the product or service has been purchased by the user, or vice versa. The computer system may determine an adjustment to one or more sub-weights indicative of a strong correlation between datasets associated with the one or more sub-weights and the associated value. The computer system may generate an adjusted machine learning model based on the adjusted sub-weights. Additionally, and/or alternatively, the computer system may update sub-weights for all the datasets, and re-select one or more updated sub-weights indicative of strong correlation between datasets associated with the one or more updated sub-weights and an associated value.

In some embodiments, the computer system may train the machine learning model based on the feedback measurement indicative of user purchases associated with the product or service. As one example, the computer system may receive the feedback measurement indicating that the user has purchased the product or service. The computer system may determine a profit value produced by the product or service. The computer system may determine an adjustment to further refine one or more sub-weights indicative of a strong correlation between datasets associated with the one or more sub-weights and the associated value. The computer system may generate an adjusted value based on the adjusted sub-weights. The adjusted value may be more consistent with the profit value compared with the previous value. As another example, the computer system may update sub-weights for all the datasets, and re-select one or more updated sub-weights indicative of strong correlation between datasets associated with the one or more updated sub-weights and an associated value. The computer system may replace the previous sub-weights indicative of a strong correlation between datasets associated with the sub-weights and the associated value by the adjusted sub-weights. The computer system may determine an adjusted correlation between a dataset associated with the adjusted sub-weights and the adjusted value.

In some embodiments, the computer system may determine loan information associated with the customer identifier using the machine learning model. For instance, the machine learning model may use the financial data and vehicle data as inputs, and the machine learning model may output the loan information. The computer system may use the graphical user interface (GUI) to display the loan information on the user device. In some embodiments, the computer system may allow the user to adjust the financial data and/or vehicle data via the graphical user (GUI). The loan information outputted by the machine learning model will be adjusted based on the adjusted financial data and/or vehicle data. In some embodiments, the computer system may use the machine learning model to determine financial information for the dealer. The computer system may use the graphical user interface (GUI) to display the financial information on a user device used by the dealer.

In some embodiments, loan information (e.g., a higher interest rate) may result in a vehicle purchase being more profitable, but may result in the vehicle purchase being less likely. Alternatively, loan information may result in the vehicle purchase being most likely, but may result in the vehicle purchase being less profitable. To determine loan information resulting in the vehicle purchase being more profitable and being most likely, the computer system may compare the first value with a probability threshold and compare the second value with a profitability threshold. The probability threshold may indicate a threshold value or range for determining whether or not a customer will accept loan information to purchase the vehicle and the product or service. The profitability threshold may indicate a threshold value or range for determining whether or not the product or service is profitable. When the first value exceeds the probability threshold, the computer system may determine that the customer is most likely to accept the loan information to purchase the vehicle and the product or service. When the first value does not exceed the probability threshold, the computer system may determine that the customer is less likely to accept the loan information to purchase the vehicle and the product or service. When the second value exceeds the profitability threshold, the computer system may determine that the vehicle and the product or services are most likely to produce an acceptable profit. When the second value does not exceed the profitability threshold, the computer system may determine that the vehicle and the product or services are less likely to produce an acceptable profit. The computer system may select recommended vehicle products or services and loan information based on vehicle products or services and/or loan information that satisfies at least the threshold of profitability and/or probability of purchase criteria (e.g., threshold values), and/or that optimizes a function of profitability and probability.

In some embodiments, the computer system may send indications of loan information, recommended vehicle products or services, recommended vehicles, and the like based on a determination that a probability of purchase value for a vehicle and a related product or service based on loan information exceeds a probability threshold and based on a determination that a profitability of a purchase of a vehicle and a related product or service based on loan information exceeds a profitability threshold. For example, the computer system may use one or more graphical user interfaces to display the vehicle, the product or service, and loan information. In some embodiments, the computer system may use the one or more graphical user interfaces to further display weights, sub-weights, and/or the value to a user (e.g., a dealer) to better understand the datasets that have strong correlations with the value such that the user may make an adjustment to the dataset for later use. For example, the computer system may compare sub-weights with a sub-weight threshold. The sub-weight threshold may describe a threshold for determining whether or not a dataset has strong correlation with the value. If the computer system determines that the sub-weight is greater than a sub-weight threshold, the computer system may send an indication of the sub-weight and the value to a user device for presentation.

In some embodiments, the computer system may determine that a customer is less likely or unlikely to purchase a vehicle and a product or service according to loan information (e.g., interest rate, loan terms, or the like), and/or the computer system may determine that a purchase for a vehicle and a product or service will be less likely or unlikely to produce an acceptable profit according to the loan information. When the computer system receives approved loan information from a lender for a customer, the computer system may select or request a different loan (e.g., different interest rates or different loan terms) based on whether the received loan information satisfies both the probability threshold and the profitability threshold.

In some embodiments, the computer system may select and recommend one or more lenders to provide a loan to use in a customer's purchase of a vehicle. For example, the computer system may select a lender who provides the most profitable loan that is also most likely to result in a customer purchasing a vehicle. Conversely, the system may also selectively determine which application should be routed to which lender. In some embodiments, the computer system may receive two or more loan information associated with purchasing the vehicle from two or more lenders (e.g., different lenders may approve different loan terms, different interest rates, or the like). The computer system may select a lender who approves an interest rate that is most likely to result in a higher profit than other interest rates, and/or that is most likely to result in the customer purchasing the vehicle. Alternatively, the computer system may determine that one interest rate available to the customer is less likely to result in the customer purchasing the vehicle than if another interest rate were presented to the customer. In this manner, the computer system may consider whether loan information, such as an interest rate, is likely to be profitable, and whether the loan information is likely to result in a purchase or result in the customer walking away. Accordingly, the computer system's machine learning may balance the interests of profitability and likelihood of purchase to provide recommended vehicle products or services and/or loan information for a purchase of a vehicle.

In some embodiments, the computer system may select a profitable product or service that is also most likely to result in a purchase of the product or service. For example, the computer system may determine multiple products or services associated with a vehicle. For each of the products or services, the computer system may determine a value indicative of a probability that a customer will purchase the vehicle and that product or service based on the loan information. The computer system may determine whether or not each value exceeds a probability threshold. The computer system may select products or services having a value exceeding a probability threshold, and send indications of the selected products or services to a user device for presentation.

In some embodiments, the computer system may recommend multiple vehicles, products or services, and loans with different loan terms to a customer. For example, a customer may be interested in a vehicle. The computer system may also recommend one or more similar vehicles and associated products or services and loan information that may result in an acceptable profit and that the customer is most likely to purchase. As an example, a customer may be interested in multiple vehicles. For each vehicle, the computer system may recommend associated products or services and loan information that may result in an acceptable profit and that the customer is most likely to purchase. In some embodiments, the computer system may select and recommend the most profitable vehicles (e.g., the three most profitable vehicles based on respective loan information for the vehicles and/or related vehicle products and services). For example, the computer system may determine three or more vehicles that are associated with respective values indicative of a probability for the three or more vehicles exceeding the probability threshold and respective values indicative of a profitability for the three or more vehicles exceeding the profitability threshold. The computer system may rank the respective values associated with the three or more vehicles. A value at the first place of the ranking may indicate that a customer is most likely to accept loan information that is also most likely resulting in the highest profit than values at the second place and third place. The computer system may send the indications of the loan information associated with vehicles having the values at the top three places to the user device for presentation.

The present disclosure provides a number of technical effects and benefits. As one example of a technical effect and benefit, the systems and methods of the present disclosure may use a trained machine learning model to predict a value of a profitability of a product or service to account for a likelihood of a user purchasing the product or service, and/or a likelihood of achieving one or more dealer goals (e.g., increasing back-end gross profit, increasing front-end gross profit, etc.). The computer system may learn which datasets are more relevant to identifying products and services that a consumer is likely to purchase. As such, the computer system may continually improve its ability to identify products based on which datasets are prioritized. In addition, human bias is removed and customer experience is improved. Such systems and methods provides a robust machine learning model that efficiently improves dealership profitability regardless of complexity of dealer goals.

As another example technical effect and benefit, the computer system may use the robust machine learning model to automatically and efficiently recommend products or services while limiting user inputs, instead of requiring users to bring many personal documents and to complete redundant documents, and without requiring multiple parties and computers to determine and provide recommendations.

As yet another example technical effect and benefit, the systems and methods of the present disclosure may uses the trained machine learning model for product or service recommendation, instead of using a "middle man" such as dealers, F&I managers, and sale mangers. As such, processing time may be significantly reduced from more than one hours to several seconds.

FIG. 1 illustrates an example process 100 for vehicle product or service recommendation, in accordance with one or more example embodiments of the present disclosure.

Referring to FIG. 1, devices 102A and 102B may communicate with one or more servers 104. The device 102A may receive user inputs from a customer 103A at step 106. The customer 103A may complete redundant documents on the device 102A, and wait for dealer processing time. Moreover, the customer 103A may be required to bring many personal documents (e.g., driver's license, proof of insurance, form of payment, recent pay stubs, credit score, and history, etc.) to complete the information input into the device 102A for a vehicle purchase or lease. At step 107, the device 102A may send the user inputs to the device 102B. The device 102B may, at step 108, receive dealer inputs (e.g., a vehicle make, model, and year, and additional features of a vehicle) from a dealer 103B. At step 109, the device 102B may send the dealer inputs to the one or more servers 104. The one or more servers 104 may, at step 110, determine one or more vehicle products or services (e.g., vehicle protection, vehicle accessories, etc.). At step 111, the one or more servers 104 may send the one or more vehicle products or services to the device 102B. The device 102B may display the one or more vehicle products or services to the dealer 103B such that the dealer 103B may review and select a product or service. The device 102B may, at step 112, receive dealer selection for the product or service recommendation. At 113, the device 102B may send the product or service recommendation to the device 102A. Such process may make the product or service sales time-consuming and inefficient, and result in human bias. In addition, the customer 103A may not be interested in or may not be able to afford buying the product or service selected by the dealer 103B. The process may start over.

Still referring to FIG. 1, at step 114, the device 102A may receive a user identifier (customer identifier, e.g., a user identification number, a social security number, driver license number, etc.). At step 115, the device 102A may send the user identifier to one or more servers 105. At step 116, the one or more servers 105 may retrieve credit (e.g., financial) data associated with the user identifier (e.g., customer identifier) and vehicle data associated with a vehicle. For example, the one or more servers 105 may retrieve the credit data based on the user identifier. The one or more servers 105 may retrieve the vehicle data based on the credit data. In some embodiments, the credit data and vehicle data may be from one or more databases of the one or more servers 105. In some embodiments, the one or more servers 105 may send a request to a third-party system to retrieve the credit data and/or vehicle data.

At step 118, the one or more servers 105 may determine a first weight for the credit data and a second weight for the vehicle data. In some embodiments, the one or more servers 105 may determine the first weight and the second weight based on a machine learning model. For instance, the credit data and vehicle data may be an input for the machine learning model. The machine learning model may generate respective weights and sub-weights associated with the credit data and vehicle data. In some embodiments, the weights and sub-weights may be generated during training of the machine learning model. For instance, during training, the machine learning model may assign a sub-weight and/or bias to each dataset. The machine learning model may adjust each sub-weight in order to optimize a loss function or a cost function such that an error between an output of the machine learning model and an expected output is reduced. At step 120, the one or more servers 105, based on the first weight and the second weight, may determine a value indicative of profitability for vehicle product or service. For instance, the one or more servers 105 may determine the value using the machine learning model. The value may be an output of the machine learning model. At step 122, the one or more servers 105 may determine and send vehicle product or service and loan recommendations to the device 102A. In some embodiments (not shown in FIG. 1), the one or more servers 105 may send the vehicle product or service and loan recommendations to the device 102B. At step 124, the one or more servers 105 may display the vehicle product or service and loan recommendations to the customer 103A. In some embodiments (not shown in FIG. 1), the one or more servers 105 may display the vehicle product or service recommendation to the dealer 103B. The loan recommendations may include the loan information as described above, and the loan recommendations may be displayed concurrently with the recommended vehicle products and/or services. In this manner, the customer 103A may be presented a deal with both financial details and recommended products and services for the selected vehicle.

In some embodiments, the one or more servers 105 may use the machine learning model to predict the value of the profitability of the product or service to account for a likelihood of a user purchasing the product or service, and/or a likelihood of achieving one or more dealer goals (e.g., increasing back-end gross profit, increasing front-end gross profit, etc.). As such, human bias is removed. Such systems and methods provides a robust machine learning model that efficiently improves dealership profitability regardless of complexity of dealer goals. Moreover, the one or more servers 105 may use the robust machine learning model to automatically and efficiently recommend product or service while limiting user inputs, instead of requiring users to bring many personal documents and to complete redundant documents. Additionally, the one or more servers 105 may use the machine learning model for product or service recommendation, instead of using the device 102B. As such, processing time may be significantly reduced from more than one hours to several seconds. In some embodiments, the servers 105 are remote from the device 102A and the device 102B. The servers 105 may gain access to various information from the device 102A and the device 102B or from other additional servers and devices (not shown in FIG. 1). In some embodiments, the device 102A and the device 102B may be the same device. In some embodiments, the device 102A and the device 102B may be different.

Figure 2:
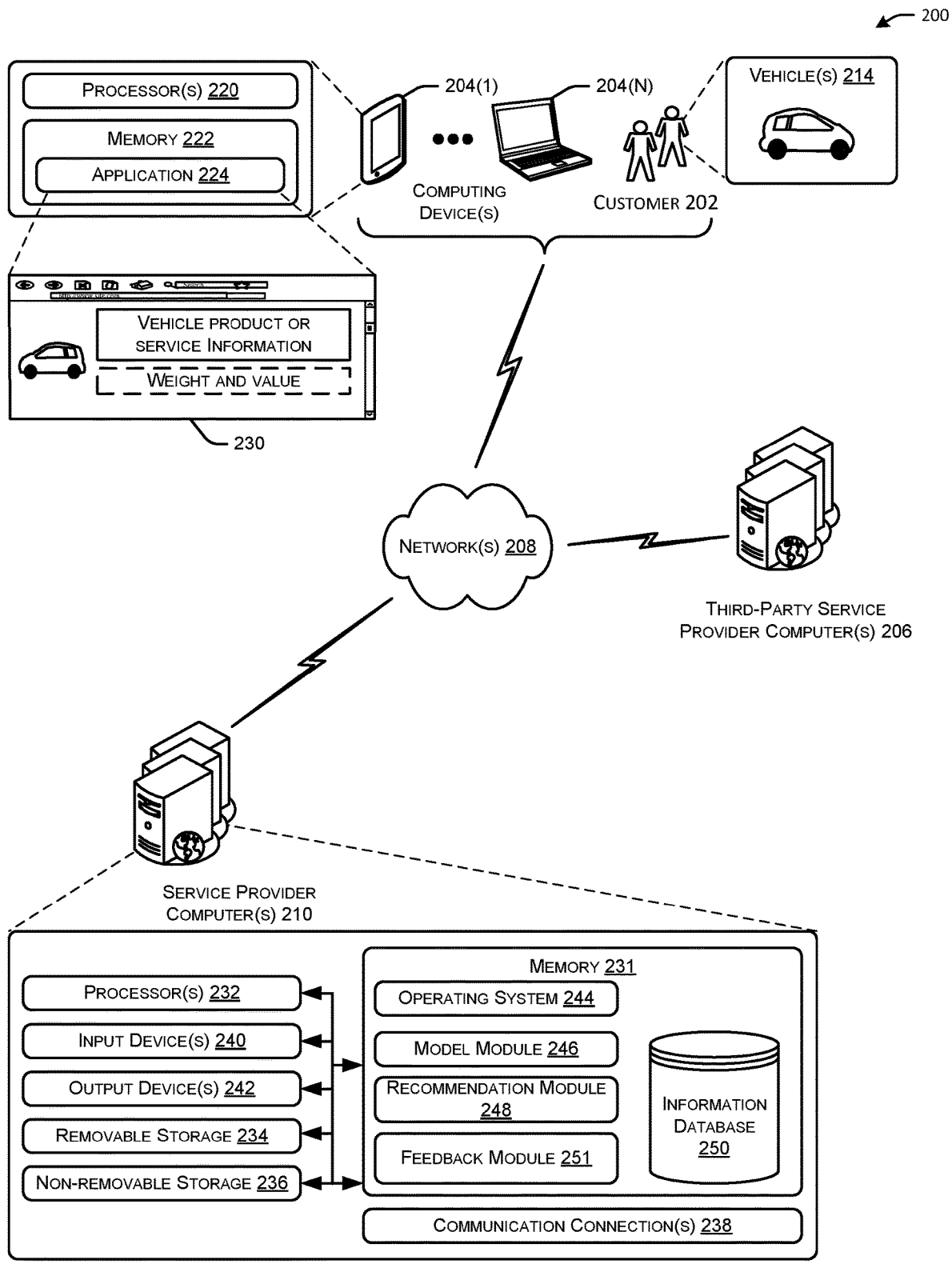
FIG. 2 depicts an illustrative system for vehicle product or service recommendation, in accordance with one or more example embodiments of the present disclosure.

FIG. 2 depicts an illustrative system 200 for vehicle product or service recommendation, in accordance with one or more example embodiments of the present disclosure.

As shown in FIG. 2, the system 200 may include one or more service provider computer(s) 210 (e.g., the one or more servers 105 of FIG. 1), one or more users (e.g., customers, dealers, etc.) 202 associated with one or more computing devices 204(1), . . . , 204(N) (e.g., the device 102 of FIG. 1), and one or more third-party service provider computer(s) 206. In the system 200, the users 202 may utilize the computing devices 204 to access an application interface 230 (or website) that may be provided by, created by, or otherwise associated with the service provider computers 210 via one or more network(s) 208. The one or more computing devices 204(1), . . . , 204(N) may call one or more active programming interfaces of the one or more service provider computers 210 using the application interface 230 to provide a user identifier (e.g., customer identifier) and receive product or service recommendations and/or associated information (e.g., weight and value indicative of a profitability of a product or service). In some instances, the computing device(s) 204 may be configured to present or otherwise display the application interface 230 to the users 202. While the illustrated example represents the users 202 accessing the application interface 230 over the network(s) 208, the described techniques may equally apply in instances where the users 202 interact with a service provider via a personal computer, over the phone, via a kiosk, or in any other manner. It is also noted that the described techniques may apply in other client/server arrangements (e.g., set-top boxes, etc.), as well as in non-client/server arrangements (e.g., locally stored software applications, etc.).

In some aspects, the application interface 230 associated with the computing device(s) 204 may allow the users 202 to access, receive from, transmit to, or otherwise interact with the service provider via the service provider computer(s) 210. In some examples, the application interface 230 may also allow the users 202 to transmit to the service provider computer(s) 210 over the network(s) 208 information associated with one or more vehicles 214.

The service provider computer(s) 210 may be any type of computing devices, such as, but not limited to, mobile, desktop, and/or cloud computing devices, such as servers. In some examples, the service provider computer(s) 210 may be in communication with the computing device(s) 204 and the third party service provider computer(s) 206 via the network(s) 208, or via other network connections. The service provider computer(s) 210 may include one or more servers, perhaps arranged in a cluster, as a server farm, or as individual servers not associated with one another. These servers may be configured to host a website viewable via the application interface 230 associated with the computing device(s) 204 or any other Web browser accessible by a user 202. In addition, the service provider computer(s) 210 may communicate with one or more applications or other programs running the computing device(s) 204.

The computing device(s) 204 may be any type of computing devices including, but not limited to, desktop personal computers (PCs), laptop PCs, mobile phones, smartphones, personal digital assistants (PDAs), tablet PCs, game consoles, set-top boxes, wearable computers, e-readers, web-enabled TVs, cloud-enabled devices and work stations, and the like. In certain aspects, the computing device(s) 204 may include touch screen capabilities, motion tracking capabilities, cameras, microphones, vision tracking, etc. In some instances, each computing device 204 may be equipped with one or more processors 220 and memory 222 to store applications and data, such as an auction application 224 that may display the client application interface 230 and/or enable access to a website stored on the service provider computer(s) 210, or elsewhere, such as a cloud computing network.

The third-party service provider computer(s) 206 may also be any type of computing devices such as, but not limited to, mobile, desktop, and/or cloud computing devices, such as servers. In some examples, the third-party service provider computer(s) 206 may be in communication with the service provider computer(s) 210 and/or the computing device(s) 204 via the network(s) 208, or via other network connections. The third-party service provider computer(s) 206 may include one or more servers, perhaps arranged in a cluster, as a server farm, or as individual servers not associated with one another. These servers may be configured to provide information associated with the vehicle(s) 214 (e.g., vehicle data) and/or the users 202 (e.g., credit/financial data). In some aspects, the third-party services may include, but are not limited to, information aggregation services (e.g., services that determine market values for items based on aggregated information associated with those items), financial institutions, credit institutions, and the like. As such, when requested by the service provider computer(s) 210, the third-party service provider computer(s) 206 may provide information associated with the vehicle(s) 214 and/or the users 202.

In one illustrative configuration, the service provider computer(s) 210 may include at least a memory 231 and one or more processing units (or processor(s)) 232. The processor(s) 232 may be implemented as appropriate in hardware, software, firmware, or combinations thereof. Software or firmware implementations of the processor(s) 232 may include computer-executable or machine-executable instructions written in any suitable programming language to perform the various functions described.

The memory 231 may store program instructions that are loadable and executable on the processor(s) 232, as well as data generated during the execution of these programs. Depending on the configuration and type of service provider computer(s) 210, the memory 231 may be volatile (such as random access memory (RAM)) and/or non-volatile (such as read-only memory (ROM), flash memory, etc.). The service provider computer(s) 210 or server may also include additional removable storage 234 and/or non-removable storage 236 including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 231 may include multiple different types of memory, such as static random access memory (SRAM), dynamic random access memory (DRAM), or ROM.

The memory 231, the removable storage 234, and the non-removable storage 236 are all examples of computer-readable storage media. For example, computer-readable storage media may include volatile and non-volatile, removable and non-removable media implemented in any method or technology for the storage of information such as computer-readable instructions, data structures, program modules, or other data. The memory 231, the removable storage 234, and the non-removable storage 236 are all examples of computer storage media. Additional types of computer storage media that may be present include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the desired information and which can be accessed by the service provider computer(s) 210 or other computing devices. Combinations of the any of the above should also be included within the scope of computer-readable media.

Alternatively, computer-readable communication media may include computer-readable instructions, program modules, or other data transmitted within a data signal, such as a carrier wave, or other transmission. However, as used herein, computer-readable storage media does not include computer-readable communication media.

The service provider computer(s) 210 may also contain communication connection(s) 238 that allow the service provider computer(s) 210 to communicate with a stored database, another computing device or server, user terminals, and/or other devices on a network. The service provider computer(s) 210 may also include input device(s) 240 such as a keyboard, a mouse, a pen, a voice input device, a touch input device, etc., and output device(s) 242, such as a display, speakers, printers, etc.

Turning to the contents of the memory 231 in more detail, the memory 231 may include an operating system 244 and one or more application programs or services for implementing the features disclosed herein, including a model module 246, a recommendation module 248, and a feedback module 251. In some instances, the model module 246, the recommendation module 248, and the feedback module 251 may receive, transmit, and/or store information in the database 250.

The model module 246 may generate one or more machine learning models. The machine learning models may include one or more supervised machine learning models, one or more unsupervised machine learning models, one or more neural networks (e.g., deep neural networks) or any other multi-layer non-linear models. A neural network may include a recurrent neural network (e.g., a long short-term memory recurrent neural network), a feed-forward neural network, or any other form of a neural network.

The model module 246 may train a machine learning model by adjusting weights or sub-weights of the machine learning model to optimize a loss function or a cost function such that an error between an output of the machine learning model and an expected output is reduced. The model module 246 may train one or more machine learning models using various training or learning techniques, such as, for example, backwards propagation of errors. In some embodiments, performing backwards propagation of errors may include performing truncated backpropagation through time. The model module 246 may perform a number of generalization techniques (e.g., weight decays, dropouts, etc.) to improve the generalization capability of the one or more machine learning models being trained.

In particular, the model module 246 may train the one or more machine learning models based on training sets that may be stored in the database 250. Additionally or alternatively, the training set may be received from the feedback module 251, the computing device(s) 204 and/or the third-party service provider computer(s) 206.

In some embodiments, the model module 246 may include computer logic utilized to provide desired functionality. The model module 246 can be implemented in hardware, firmware, and/or software controlling a general-purpose processor. For example, in some embodiments, the model module 246 may include program files stored on a storage device, loaded into a memory and executed by one or more processors. In some embodiments, the model module 246 may include one or more sets of computer-executable instructions that are stored in a tangible computer-readable storage medium such as RAM hard disk, or optical or magnetic media.

In some embodiments, the trained machine learning model may be included in or otherwise stored in the database 250 and implemented by the service provider computer(s) 210. Additionally or alternatively, the trained machine learning model may be included in or otherwise stored and implemented by the computing device(s) 204 that communicates with the service provider computer according to a client-server relationship. For example, the service provider computer may send the trained machine learning model to the computing device(s) 204 over the network(s) 208, stored in a memory of the computing device(s) 204, and the implemented by one or more processors of the computing device(s) 204.

In some embodiments, the model module 246 may refine or re-train a machine learning model using a value generated by the same machine learning model. As one example, the model module 246 may determine that a value generated by a machine learning model is greater than the profitability threshold, and determine that the product or service has been purchased by the user based on user purchase information received from the feedback module 251. The model module 246 may determine an adjustment to further refine one or more sub-weights indicative of a strong correlation between datasets associated with the one or more sub-weights and the value. The model module 246 may generate an adjusted machine learning model based on the adjusted sub-weights. As another example, the model module 246 may determine that the value is less than the profitability of the product or service. The model module 246 may further determine that the product or service has been purchased by the user, or vice versa. The model module 246 may determine an adjustment to one or more sub-weights indicative of a strong correlation between datasets associated with the one or more sub-weights and the associated value. The model module 246 may generate an adjusted machine learning model based on the adjusted sub-weights. Additionally, and/or alternatively, the model module 246 may update sub-weights for all the datasets, and re-select one or more updated sub-weights indicative of strong correlation between datasets associated with the one or more updated sub-weights and an associated value. In some embodiments, the model module 246 may refine or re-train the machine learning model based on the feedback measurement indicative of user purchases associated with the product or service. As one example, the model module 246 may receive the feedback measurement indicating that the user has purchased the product or service from the feedback module 251. The model module 246 may determine a profit value produced by the product or service. The model module 246 may determine an adjustment to further refine one or more sub-weights indicative of a strong correlation between datasets associated with the one or more sub-weights and the associated value. The model module 246 may generate an adjusted value based on the adjusted sub-weights. The adjusted value may be more consistent with the profit value compared with the previous value. As another example, the model module 246 may update sub-weights for all the datasets, and re-select one or more updated sub-weights indicative of strong correlation between datasets associated with the one or more updated sub-weights and an associated value. The computer system may replace the previous sub-weights indicative of a strong correlation between datasets associated with the sub-weights and the associated value by the adjusted sub-weights. The computer system may determine an adjusted correlation between a dataset associated with the adjusted sub-weights and the adjusted value.

The recommendation module 248 may use a trained machine learning model to recommend one or more products or services. The recommendation module 248 may receive a user identifier (customer identifier, e.g., a user identification number, a social security number, driver license number, etc.) from the computing device(s) 204 via the application interface 230. The recommendation module 248 may retrieve credit data associated with the user identifier and vehicle data associated with a vehicle. For example, the recommendation module 248 may retrieve the credit data and vehicle data from the database 250. In some embodiments, the recommendation module 248 may receive the credit data and/or vehicle data from the third-party service provider computers.

The recommendation module 248 may determine a first weight for the credit data and a second weight for the vehicle data based on the trained machine learning model. For instance, the credit data and vehicle data may be an input for the trained machine learning model. The recommendation module 248 may determine respective weights and sub-weights associated with the credit data and vehicle data that are assigned by the trained machine learning model. The recommendation module 248 may determine, based on the first weight and the second weight, a value indicative of a profitability of a product or service based on the trained machine learning model. The value may be an output of the machine learning model.

The recommendation module 248 may determine whether or not the value exceeds a profitability threshold. If the recommendation module 248 determines that the value is greater than the profitability threshold, the recommendation module 248 may send an indication of the product or service to the computing device(s) 204 for presentation. For example, the recommendation module 248 may send instructions to the computing device(s) 204 such that the instructions are executed by one or more processors in the computing device(s) 204 to cause the application interface 230 to display the product or service. As another example, the recommendation module 248 may generate the application interface 230 and send the application interface 230 to the computing device(s) 204 for presentation. In some embodiments, the recommendation module 248 may send an indication of weights, sub-weights, and/or the value to the computing device(s) 204. For example, the recommendation module 248 may compare sub-weights with a sub-weight threshold. If the recommendation module 248 determines that the sub-weight is greater than a sub-weight threshold, the recommendation module 248 may send an indication of the sub-weight and the value to the computing device(s) 204 for presentation.

In such way, the user 202 may be able to better understand the datasets that have strong correlations with an associated value such that the user 202 may make an adjustments to the dataset for later use. For example, the computer system may compare sub-weights with a sub-weight threshold. The sub-weight threshold may describe a threshold for determining whether or not a dataset has strong correlation with the value. If the computer system determines that the sub-weight is greater than a sub-weight threshold, the computer system may send an indication of the sub-weight and the value to a user device for presentation.

In some embodiments, the recommendation module 248 may determine whether or not sub-weights exceed a sub-weight threshold. The recommendation module 248 may determine a correlation between datasets associated with the sub-weights and the value based on the determination. For example, the recommendation module 248 may select one or more sub-weighs that are above the sub-weight threshold. The selected one or more sub-weights indicate that datasets associated with the selected one or more sub-weights may have strong correlations with a value generated by the machine learning model.

In some embodiments, the recommendation module 248 may provide multiple vehicle products or services recommendation using the credit data and the vehicle data. The recommendation module 248 may use the machine learning model to determine a first value indicative of a profitability for a first product or service (e.g., vehicle protection), and to determine a second value indicative of a profitability for a second product or service (e.g., vehicle accessories). If the first value and the second value are greater than the profitability threshold, the recommendation module 248 may send an indication of the first product or service and the second product or service to the user device for presentation. Additionally, and/or alternatively, the recommendation module 248 may determine that the second value is less than the first value, indicating that the first product or service is more likely to produce higher profit than the second product or service. The recommendation module 248 may further determine that the first product or service has been purchased by the user based on the credit data, or that the first product or service has been expired or suspended based on the vehicle data. The recommendation module 248 may remove the first product or service or replace the first product or service by the second product or service for presentation. If the first value is less than the profitability threshold and the second value is greater than the profitability threshold, the recommendation module 248 may remove or replace the first product or service by the second product or service, and send an indication of the second product or service instead of the first product or service to the computing device(s) 204 for presentation.

In some embodiments, the recommendation module 248 may determine different datasets having strong correlations with associated values for different products or services. For instance, the recommendation module 248 may determine a first group of datasets having strong correlations with the first value, and determine a second group of datasets having strong correlations with the second value. The first group and the second group are different. In some embodiments, if the recommendation module 248 uses the same machine learning model for different products or services, the recommendation module 248 may use different sub-weight threshold. For example, the recommendation module 248 may determine a first set of sub-weights that are greater than a first sub-weight threshold for the first product or service, and a set group of sub-weights that are greater than a second sub-weight threshold for the second product or service. The first sub-weight threshold is different from the second sub-weight threshold (e.g., the first sub-weight threshold is greater than the second sub-weight threshold, or vice versa), and the first set and the second set are different (e.g., at least one sub-weight in the first set is not included in the second set, or vice versa). In some embodiments, the recommendation module 248 may use different machine learning models for different products or services.

In some embodiments, the recommendation module 248 may determine loan information associated with the user identifier (e.g., customer identifier) using the machine learning model. For instance, the machine learning model may use the credit data and vehicle data as inputs and the machine learning model may output the loan information. The recommendation module 248 may use the graphical user interface (GUI) to display the loan information on the computing device(s) 204. In some embodiments, the recommendation module 248 may use the machine learning model to determine loan information for the dealer. The recommendation module 248 may use the graphical user interface (GUI) to display the loan information on the computing device(s) 204. The loan information (e.g., financial information for the proposed vehicle deal) may include loan details such as payment schedule, lender, interest rate, and the like.

The feedback module 251 may receive user purchase information from the computing device(s) 204. For example, the feedback module 251 may perform the feedback measurement indicative of user purchases associated with the product or service based on the user purchase information. The feedback module 251 may receive the user purchase information in the database 250.

The computing device(s) 204, the one or more third-party service provider computer(s) 206, and the one or more service provider computer(s) 210 may be configured to communicate via the one or more network(s) 208, wirelessly or wired. The one or more network(s) 208 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, the one or more network(s) 208 may have any suitable communication range associated therewith and may include, for example, global networks (e.g., the Internet), metropolitan area networks (MANs), wide area networks (WANs), local area networks (LANs), or personal area networks (PANs). In addition, the one or more network (s) 208 may include any type of medium over which network traffic may be carried, including, but not limited to, coaxial cable, twisted-pair wire, optical fiber, a hybrid-fiber coaxial (HFC) medium, microwave terrestrial transceivers, radio frequency communication mediums, white space communication mediums, ultra-high frequency communication mediums, satellite communication mediums, or any combination thereof.

Various instructions, methods, and techniques described herein may be considered in the general context of computer-executable instructions, such as program modules, executed by one or more computers or other devices. Generally, program modules may include routines, programs, objects, components, data structures, etc., for performing particular tasks or implementing particular abstract data types. These program modules and the like may be executed as native code or may be downloaded and executed, such as in a virtual machine or other just-in-time compilation execution environment. Typically, the functionality of the program modules may be combined or distributed as desired in various embodiments. An implementation of these modules and techniques may be stored on some form of computer-readable storage media.

The example architectures and computing devices shown in FIG. 2 are provided by way of example only. Numerous other operating environments, system architectures, and device configurations are possible. Accordingly, embodiments of the present disclosure should not be construed as being limited to any particular operating environment, system architecture, or device configuration.

Figure 3:
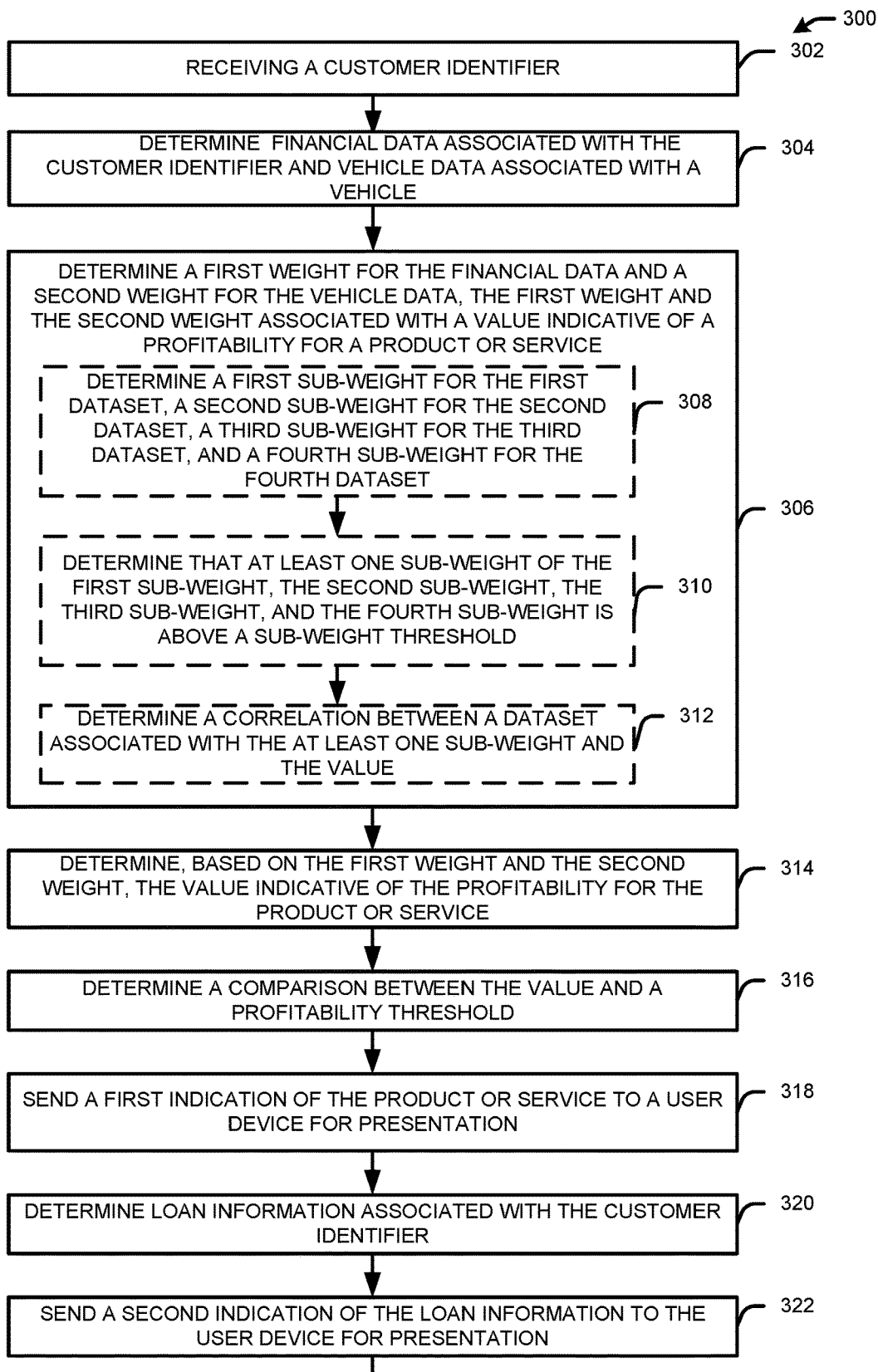
FIG. 3 illustrates an example flow diagram showing a process for vehicle product or service recommendation, in accordance with one or more example embodiments of the present disclosure.

FIG. 3 illustrates an example flow diagram showing a process 300 for vehicle product or service recommendation, in accordance with one or more example embodiments of the present disclosure.

At block 302, a device or system (e.g., the one or more servers 105 of FIG. 1, the one or more service provider computers 210 of FIG. 2) may receive a user identifier (customer, e.g., a user identification number, a social security number, driver license number, etc.). For example, a non-transitory computer-readable medium storing computer-executable instructions, which when executed by one or more processors of the device, result in performing operations that may include receiving a user identifier. For example, a system may provide a graphical user interface (GUI) to a user (e.g., a customer, or a dealer) for inputting a customer identifier.

At block 304, the device may retrieve credit data associated with the user identifier and vehicle data associated with a vehicle. For example, a device or system may determine the financial data based on the customer identifier. The device or system may determine the vehicle data based on the financial data. In some embodiments, the financial data and vehicle data may be from one or more databases of the computer system. In some embodiments, the device or system may send a request to a third-party system to retrieve the financial data and/or vehicle data. In some embodiments, the vehicle data is first vehicle data and the vehicle is a first vehicle. In this manner, additional vehicles and their associated vehicle data may be evaluated for determining a customer's credit and ability to purchase the vehicles. A non-transitory computer-readable medium storing computer-executable instructions, which when executed by one or more processors of the device result in performing operations that may include retrieving credit data associated with the user identifier and vehicle data associated with a vehicle. In this manner, additional vehicles and their associated vehicle data may be evaluated for determining a customer's credit and ability to purchase the vehicles.

At block 306, the device may determine a first weight for the credit data and a second weight for the vehicle data. The first weight and the second weight may be associated with a value indicative of a profitability for a product or service. For instance, the financial data and vehicle data may be an input for the machine learning model. The machine learning model may generate respective weights and sub-weights associated with the financial data and vehicle data. In some embodiments, the weights and sub-weights may be generated during training the machine learning model. For instance, during training, the machine learning model may assign a sub-weight and/or bias to each dataset. The machine learning model may adjust each sub-weight in order to optimize a loss function or a cost function such that an error between an output of the machine learning model and an expected output is reduced. In some embodiments, the credit data may include a first dataset and a second dataset, the vehicle data may include a third dataset and a fourth dataset. The value indicative of the profitable may be an output of the machine learning model. For example, a non-transitory computer-readable medium storing computer-executable instructions which when executed by one or more processors of the device result in performing operations that may include determining a first weight for the credit data and a second weight for the vehicle data.

At block 308, the device may determine a first sub-weight for the first dataset, a second sub-weight for the second dataset, a third sub-weight for the third dataset, and a fourth sub-weight for the fourth dataset. For example, credit data may include a first dataset and a second dataset, the vehicle data may include a third dataset and a fourth dataset. The device may determine respective sub-weights for the above datasets. A non-transitory computer-readable medium storing computer-executable instructions, which when executed by one or more processors of the device, result in performing operations that may include determining a first sub-weight for the first dataset, a second sub-weight for the second dataset, a third sub-weight for the third dataset, and a fourth sub-weight for the fourth dataset.

At block 310, the device may determine that at least one sub-weight of the first sub-weight, the second sub-weight, the third sub-weight, and the fourth sub-weight is above a sub-weight threshold. In some embodiments, the device or system may determine whether or not sub-weights exceed a sub-weight threshold (e.g., via a comparison to a threshold). For example, a non-transitory computer-readable medium storing computer-executable instructions, which when executed by one or more processors of the device, result in performing operations that may include determining that at least one sub-weight of the first sub-weight, the second sub-weight, the third sub-weight, and the fourth sub-weight is above a sub-weight threshold.

At block 312, the device may determine a correlation between a dataset associated with the at least one sub-weight and the value. For example, the device or system may select one or more sub-weighs that are above the sub-weight threshold. The selected one or more sub-weights indicate that datasets associated the selected one or more sub-weights may have strong correlations with the value. A non-transitory computer-readable medium storing computer-executable instructions, which when executed by one or more processors of the device, result in performing operations that may include determining a correlation between a dataset associated with the at least one sub-weight and the value.

At block 314, the device may determine, based on the first weight and the second weight, the value. For example, the device or system may determine the value using the machine learning model. The value may be an output of the machine learning model. A non-transitory computer-readable medium storing computer-executable instructions, which when executed by one or more processors of the device, result in performing operations that may include determining, based on the first weight and the second weight, the value.

At block 316, the device may determine whether or not a value exceeds a profitability threshold. For example, the value exceeding the profitability threshold may indicate that the product or service is most likely to produce a product to equal to or exceed a profit goal. The value that does not exceed the profitability threshold may indicate that the product or service is less likely to produce a product to equal to or exceed a profit goal. In some embodiments, the device or system may further determine whether or not the product or service will be purchased by the customer. A non-transitory computer-readable medium storing computer-executable instructions, which when executed by one or more processors of the device, result in performing operations that may include determining whether or not the value exceeds a profitability threshold.

At block 318, the device may send a first indication of the product or service to a user device (e.g., the device 102A of FIG. 1, or the computing device 204 of FIG. 2) for presentation. For example, a non-transitory computer-readable medium storing computer-executable instructions, which when executed by one or more processors of the device, result in performing operations that may include sending a first indication of the product or service to a user device for presentation. When the device or system determines that the value is greater than the profitability threshold, the device or system may send an indication of the product or service to a user device for presentation. For example, the device or system may use one or more graphical user interfaces to display the product or service. In some embodiments, the device or system may use the one or more graphical user interfaces to further display weights, sub-weights, and/or the value to a user (e.g., a dealer) to better understand the datasets that have strong correlations with the value such that the user may make an adjustments to the dataset for later use. For example, the device or system may compare sub-weights with a sub-weight threshold. The sub-weight threshold may describe a threshold for determining whether or not a dataset having strong correlation with the value. If the device or system determines that the sub-weight is greater than a sub-weight threshold, the device or system may send an indication of the sub-weight and the value to a user device for presentation.

At block 320, the device may determine loan information associated with the user identifier. For example, a non-transitory computer-readable medium storing computer-executable instructions, which when executed by one or more processors of the device, result in performing operations that may include determining loan information associated with the user identifier. The machine learning model may use the financial data and vehicle data as inputs, and the machine learning model may output the loan information. As an example, the system may receive loan information from one or more lenders.

At block 322, the device may send a second indication of the loan information to the user device (e.g., the device 102A of FIG. 1, or the computing device(s) 204 of FIG. 2) for presentation. For example, the device or system may use the graphical user interface (GUI) to display the loan information on the user device. In some embodiments, the device or system may allow the user to adjust the financial data and/or vehicle data via the graphical user (GUI). The loan information outputted by the machine learning model will be adjusted based on the adjusted financial data and/or vehicle data. In some embodiments, the device or system may use the machine learning model to determine financial information for the dealer. The device or system may use the graphical user interface (GUI) to display the financial information on a user device used by the dealer. For example, a non-transitory computer-readable medium storing computer-executable instructions, which when executed by one or more processors of the device, result in performing operations that may include sending a second indication of the loan information to the user device.

Figure 4:
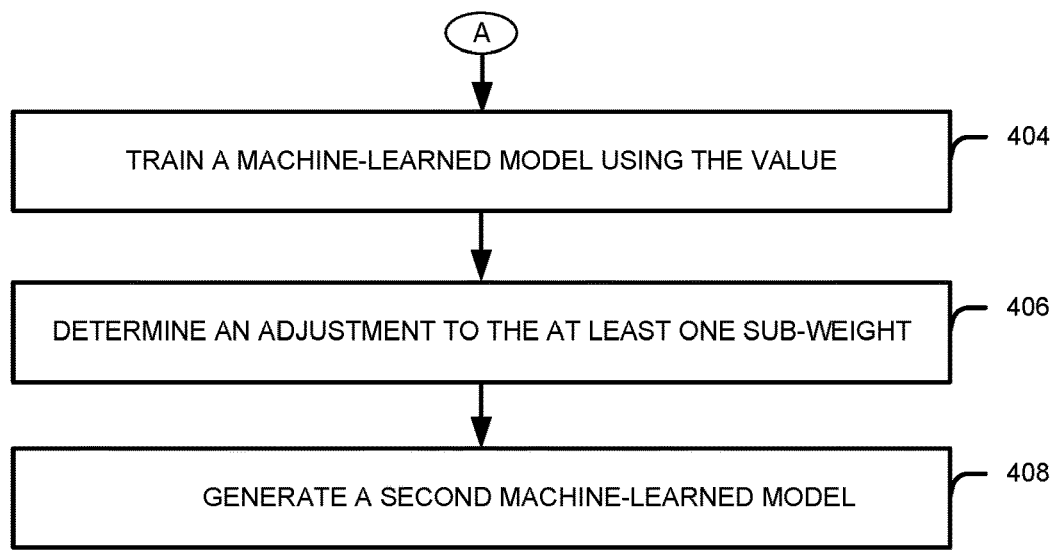
FIG. 4 illustrates an example flow diagram showing a process to generate and apply a machine learning model for vehicle product or service recommendation, in accordance with one or more example embodiments of the present disclosure.

FIG. 4 illustrates an example flow diagram showing a process 400 to generate and apply a machine learning model for vehicle product or service recommendation, in accordance with one or more example embodiments of the present disclosure. As illustrated, the process 400 may continue from block A of FIG. 3.

At block 404, a device or system (e.g., the one or more servers 105 of FIG. 1, the one or more service provider computers 210 of FIG. 2) may train a machine learning model using the value determined at block 306 of FIG. 3. For instance, the system may train the machine learning model using training sets. A non-transitory computer-readable medium storing computer-executable instructions which when executed by one or more processors of the device result in performing operations that may include training the machine-learn model using the value.

At block 406, the device may determine an adjustment to the at least one sub-weight. As one example, the system may determine that the value is greater than the profitability threshold, and determine that the product or service has been purchased by the user. The system may determine an adjustment to further refine one or more sub-weights indicative of a strong correlation between datasets associated with the one or more sub-weights and the associated value. The system may generate an adjusted machine learning model based on the adjusted sub-weights. As another example, the system may determine that the value is less than the profitability of the product or service. The system may further determine that the product or service has been purchased by the user, or vice versa. The system may determine an adjustment to one or more sub-weights indicative of a strong correlation between datasets associated with the one or more sub-weights and the associated value. The system may generate an adjusted machine learning model based on the adjusted sub-weights. Additionally, and/or alternatively, the system may update sub-weights for all the datasets, and re-select one or more updated sub-weights indicative of strong correlation between datasets associated with the one or more updated sub-weights and an associated value. For instance, a non-transitory computer-readable medium storing computer-executable instructions which when executed by one or more processors of the device result in performing operations that may include determining an adjustment to the at least on sub-weight.

At block 408, the device or system may generate, based on the adjustment to the at least one sub-weight, a second machine learning model. For instance, the device or system may generate a second machine learning model using the adjusted sub-weights. A non-transitory computer-readable medium storing computer-executable instructions, which when executed by one or more processors of the device, result in performing operations that may include generating, based on the adjustment to the at least one sub-weight, a second machine learning model.

Figure 5:
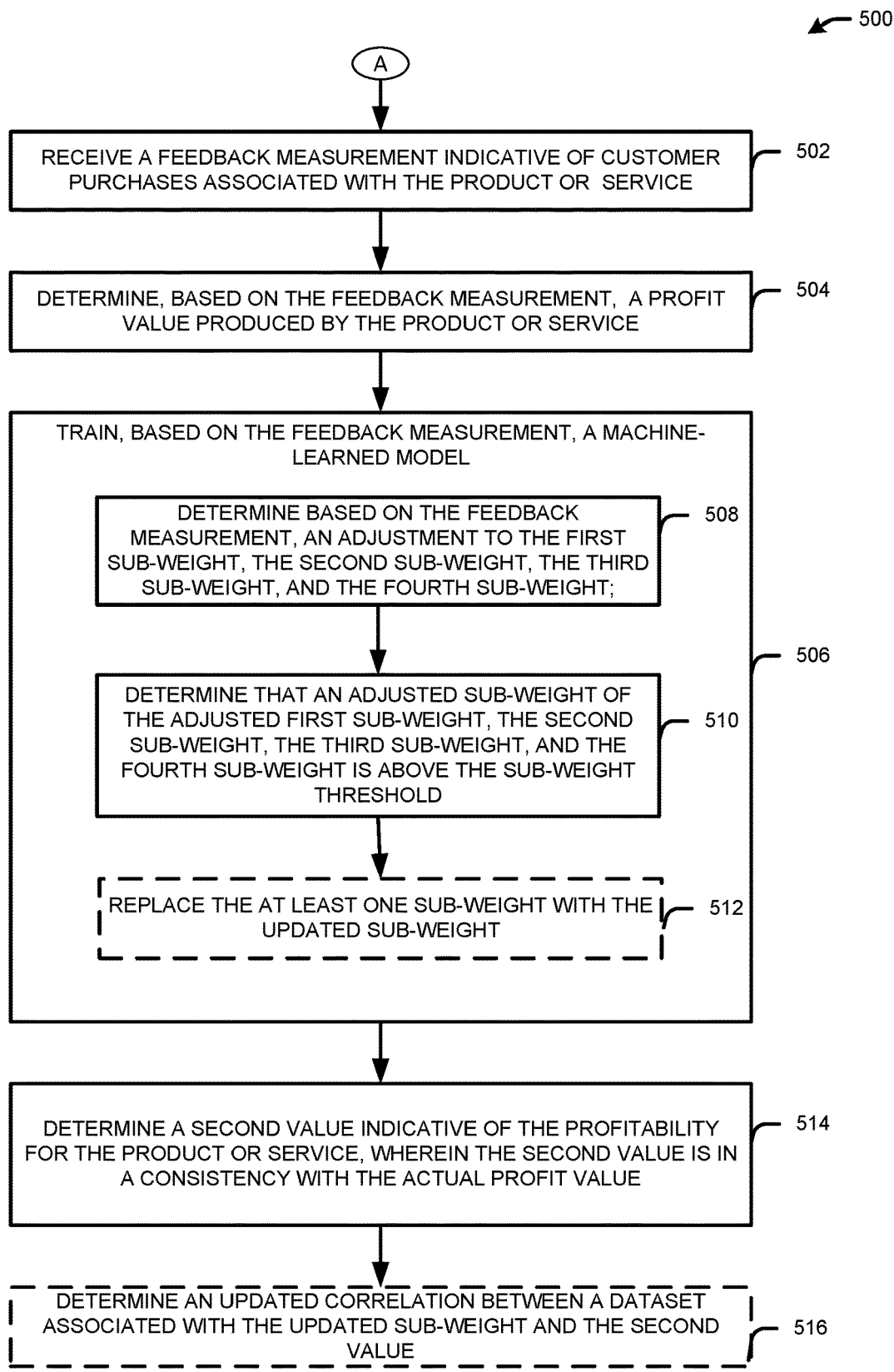
FIG. 5 illustrates an example flow diagram showing a process to train a machine learning model using feedback measurements for vehicle product or service recommendation, in accordance with one or more example embodiments of the present disclosure.

FIG. 5 illustrates an example flow diagram showing a process 500 to train a machine learning model using feedback measurements for vehicle product or service recommendation, in accordance with one or more example embodiments of the present disclosure. As illustrated, the process 500 may continue from block A of FIG. 3.

At block 502, a device or system (e.g., the one or more servers 105 of FIG. 1, the one or more service provider computer(s) 210 of FIG. 2) may receive a feedback measurement indicative of user purchases associated with the product or service. For instance, the device or system may receive the feedback measurement, indicating that the customer has purchased the product or service. A non-transitory computer-readable medium storing computer-executable instructions, which when executed by one or more processors of the device, result in performing operations that may include receiving a feedback measurement indicative of user purchases associated with the product or service.

At block 504, the device may determine, based on the feedback measurement, a profit value produced by the product or service. For example, the device or system may determine a higher profit value for the product or service that the customer has purchased than a profit value for the product or service that the customer has not purchased. A non-transitory computer-readable medium storing computer-executable instructions, which when executed by one or more processors of the device, result in performing operations that may include determining a profit value produced by the product or service. The operations may further include determining one or more users have purchased the product or service based on the feedback measurement.

At block 506, the device may train, based on the feedback measurement, the machine learning model. For instance, during training, the machine learning model may assign a sub-weight and/or bias to each dataset obtained from the feedback measurement. The machine learning model may adjust each sub-weight in order to optimize a loss function or a cost function such that an error between an output of the machine learning model and an expected output is reduced. A non-transitory computer-readable medium storing computer-executable instructions, which when executed by one or more processors of the device, result in performing operations that may include training, based on the feedback measurement, the machine learning model.

At block 508, the device may determine, based on the feedback measurement, an adjustment to the first sub-weight, the second sub-weight, the third sub-weight, and the fourth sub-weight. For instance, the device or system may determine an adjustment to further refine one or more sub-weights indicative of a strong correlation between datasets associated with the one or more sub-weights and the associated value. A non-transitory computer-readable medium storing computer-executable instructions, which when executed by one or more processors of the device, result in performing operations that may include determining, based on the feedback measurement, an adjustment to the first sub-weight, the second sub-weight, the third sub-weight, and the fourth sub-weight.

At block 510, the device may determine that an adjusted sub-weight of the adjusted first sub-weight, the second sub-weight, the third sub-weight, and the fourth sub-weight is above the sub-weight threshold. For instance, the device or system may generate an adjusted value based on the adjusted sub-weights. The adjusted value may be more consistent with the profit value compared with the previous value. As another example, the computer system may update sub-weights for all the datasets, and re-select one or more updated sub-weights indicative of strong correlation between datasets associated with the one or more updated sub-weights and an associated value. A non-transitory computer-readable medium storing computer-executable instructions, which when executed by one or more processors of the device, result in performing operations that may include determining that an adjusted sub-weight of the adjusted first sub-weight, the second sub-weight, the third sub-weight, and the fourth sub-weight is above the sub-weight threshold.

At block 512, the device may replace the at least one sub-weight with the adjusted sub-weight. For example, the device or system may replace the previous sub-weights indicative of a strong correlation between datasets associated with the sub-weights and the associated value by the adjusted sub-weights. The system may determine an adjusted correlation between a dataset associated with the adjusted sub-weights and the adjusted value. A non-transitory computer-readable medium storing computer-executable instructions, which when executed by one or more processors of the device, result in performing operations that may include replacing the at least one sub-weight with the adjusted sub-weight. The operations may further include determining that the adjusted sub-weight and the at least one sub-weight are associated with different datasets.

At block 514, the device may determine, based on the adjustment to the at least one sub-weight, a second value indicative of the profitability for the product or service, wherein the second value is consistent with the profit value. For example, the device or system may utilize the machine learning model to determine the second value is consistent with the profit value based on adjusted sub-weights. A non-transitory computer-readable medium storing computer-executable instructions, which when executed by one or more processors of the device, result in performing operations that may include determining, based on the adjustment to the at least one sub-weight, a second value indicative of the profitability for the product or service.

At block 516, the device may determine an updated correlation between a dataset associated with the adjusted sub-weight and the second value. For example, the adjusted sub-weights may indicate a strong correlation between datasets associated with the one or more adjusted sub-weights and an associated value. The device or system may replace a previous correlation between a dataset associated with a previous sub-weight and a previous value with that strong correlation between datasets associated with the one or more adjusted sub-weights and an associated value. The device or system may further determine that the adjusted sub-weight and the at least one sub-weight are associated with different datasets. A non-transitory computer-readable medium storing computer-executable instructions, which when executed by one or more processors of the device, result in performing operations that may include determining an updated correlation between a dataset associated with the adjusted sub-weight and the second value.

Figure 6:
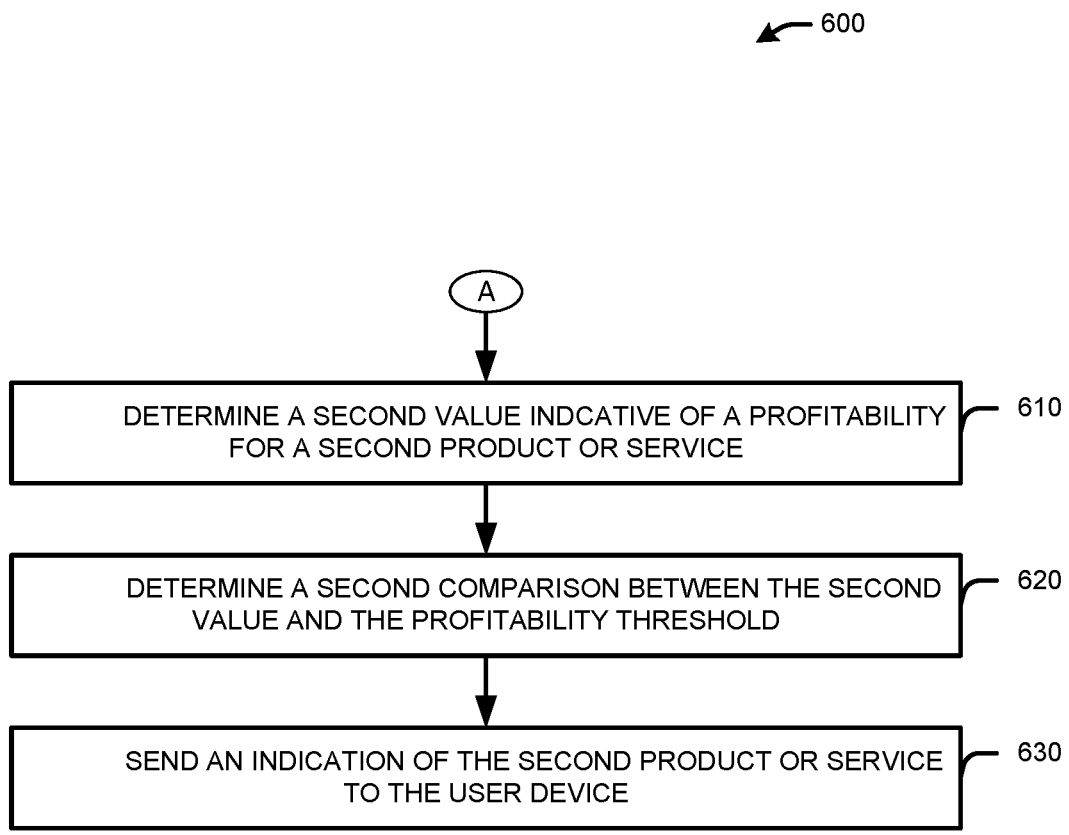
FIG. 6 illustrates an example flow diagram showing a process for multiple vehicle products or services recommendations, in accordance with one or more example embodiments of the present disclosure.

FIG. 6 illustrates an example flow diagram showing a process 600 for multiple vehicle products or services recommendations, in accordance with one or more example embodiments of the present disclosure. As illustrated, the process 600 may continue from block A of FIG. 3.

At block 610, a device or system (e.g., the one or more servers 105 of FIG. 1, the one or more service provider computer(s) 210 of FIG. 2) may determine, based on the first weight and the second weight, a second value indicative of a profitability for a second product or service. For example, the device or system may provide multiple vehicle products or services recommendations using the financial data and the vehicle data. The computer system may use the machine learning model to determine a first value indicative of a profitability for a first product or service (e.g., vehicle protection), and to determine a second value indicative of a profitability for a second product or service (e.g., vehicle accessories). A non-transitory computer-readable medium storing computer-executable instructions, which when executed by one or more processors of the device, result in performing operations that may include determining, based on the first weight and the second weight, a second value indicative of a profitability for a second product or service.

At block 620, the device may determine whether or not the second value exceeds the profitability threshold. For example, when the first value and the second value are greater than the profitability threshold, the device or system may send an indication of the first product or service and the second product or service to the user device for presentation. Additionally, or alternatively, the device or system may determine that the second value is less than the first value, indicating that the first product or service is more likely to produce higher profit than the second product or service. The device or system may further determine that the first product or service has been purchased by the user based on the financial data, or that the first product or service has been expired or suspended based on the vehicle data. If the first product or service associated with a first vehicle has been purchased by the user, the device or system may provide the same product or service (or a similar product or service) associated with a second vehicle for the user. If the first product or service has been expired or suspended, the device or system may remove the first product or service or replace the first product or service by the second product or service (e.g., an updated version of the first product or service, or next available product or service) for presentation. If the first value is less than the profitability threshold and the second value is greater than the profitability threshold, the system may remove or replace the first product or service by the second product or service, and send an indication of the second product or service instead of the first product or service to the user device for presentation. A non-transitory computer-readable medium storing computer-executable instructions, which when executed by one or more processors of the device, result in performing operations that may include determining whether or not the second value exceeds the profitability threshold.

At block 630, the device may send an indication of the second product or service to the user device. For example, the device or system may use the graphical user interface (GUI) to display the second product or service on the user device. In some embodiments, the device or system may allow the user to adjust the presented product or service via the graphical user (GUI). For example, a non-transitory computer-readable medium storing computer-executable instructions, which when executed by one or more processors of the device, result in performing operations that may include sending an indication of the second product or service to the user device.

Figure 7:
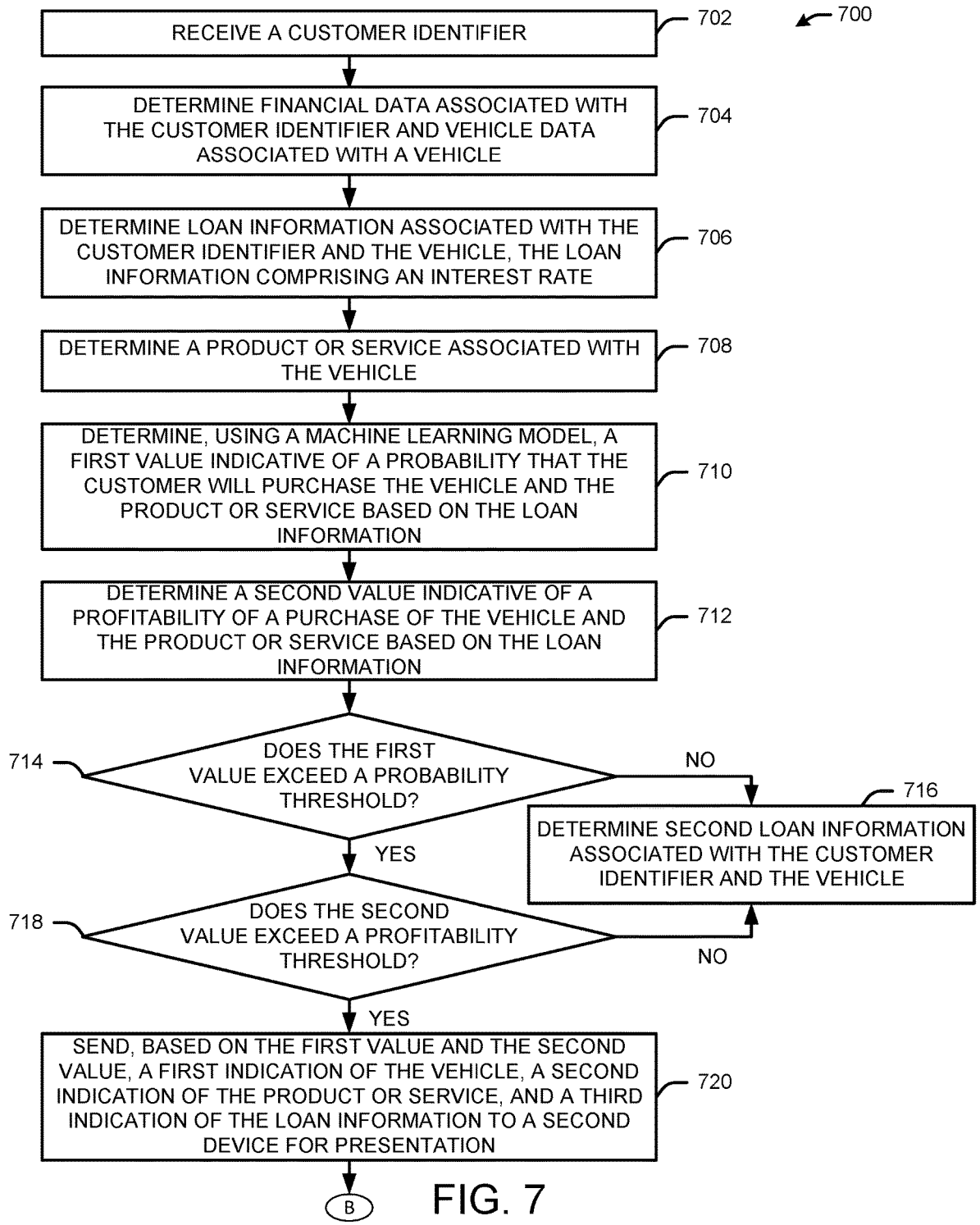
FIG. 7 illustrates an example flow diagram showing a process for recommending vehicle products, services, and loans, in accordance with one or more example embodiments of the present disclosure.

FIG. 7 illustrates an example flow diagram showing a process 700 for recommending vehicle products, services, and loans, in accordance with one or more example embodiments of the present disclosure.

At block 702, a system (e.g., the one or more servers 105 of FIG. 1, the one or more service provider computer(s) 210 of FIG. 2) may receive a customer identifier (e.g., a user identification number, a social security number, driver license number, etc.). For example, the system may provide a graphical user interface (GUI) to a user (e.g., a customer, or a dealer) for inputting a customer identifier.

At block 704, the system may determine financial data associated with the customer identifier and vehicle data associated with a vehicle. In some embodiments, the financial data and vehicle data may be from one or more databases of the system. In some embodiments, the system may send a request to a third-party system to retrieve the financial data and/or vehicle data.

At block 706, the system may determine loan information associated with the customer identifier and the vehicle. The loan information may include an interest rate, price of the vehicle, monthly payments, a payment term, one or more credit limits, a loan to value ratio, and/or any suitable information associated with loans for a customer with the customer identifier. For example, the system may determine loan information based on the financial data associated with the customer identifier and vehicle data. As another example, based on the customer's financial data, one or more lenders may determine the loan information with which the customer may be approved to purchase the vehicle. The system may receive loan information from multiple lenders.

At block 708, the system may determine a product or service associated with the vehicle. The product or service may include product or services for vehicle protection, vehicle accessories, extended warranties, insurance, paint protections, or any suitable product or service associated with a vehicle. In some embodiments, a product or service may include a vehicle. In some embodiments, the system may determine the product or service based on the vehicle data and/or financial data. For example, the system may determine that a vehicle may have deals for vehicle accessories (e.g., mud flaps or the like) based on the vehicle data, including deals and features associated with the deals. The system may recommend mud flaps to the customer. In some embodiments, the system may determine multiple products or services associated with a vehicle to a customer. In some embodiments, the system may recommend the most profitable products or services that a customer will be most likely to purchase to the customer.

At block 710, the system may determine, using a machine learning model, a first value indicative of a probability that the customer will purchase the vehicle and the product or service based on the loan information. In some embodiments, the system may utilize a machine—learned model to determine the first value based on the loan information that was considered for other similar vehicles and/or for similar customers. In some embodiments, the system may determine a threshold interest rate based on previous purchases by the same customer for similar vehicles, previous purchases by similar customers for the same vehicle, and/or previous purchases by similar customers for similar vehicle. For example, an interest rate is less than or equal to the threshold interest rate. The system may determine that a customer is most likely to accept the interest rate. As another example, an interest rate is greater than the threshold interest rate. The system may determine that a customer is less likely to accept the interest rate. The system may adjust an interest rate to be less than or equal to the threshold interest rate.

At block 712, the system may determine a second value indicative of a profitability of a purchase of the vehicle and the product or service based on the loan information. The second value indicative of the vehicle's profitability may be an indication of how profitable a purchase of the vehicle may be when purchased according to the loan information. For example, a higher interest rate of the loan information may result in a more profitable transaction. A longer payment period may result in more interest paid over time, and therefore a more profitable transaction. For example, in some embodiments, the system may use the machine learning model to further determine the second value based on the loan information that was considered for other similar vehicles, and/or for similar customers. As another example, the system may use the machine learning model to further determine the second value based on the loan information, a first weight for the financial data and a second weight for the vehicle data, as described with respect to FIG. 3.

At block 714, the system may compare the first value with a probability threshold. The probability threshold may indicate a threshold value or range for determining whether or not a customer will accept loan information to purchase the vehicle and the product or service. If the first value does not exceed the probability threshold, the system may determine that the customer is less likely to accept the loan information to purchase the vehicle and the product or service, and then the system may perform actions in block 716.

At block 716, the system may determine second loan information associated with the customer identifier and the vehicle. For example, the system may adjust one or more parameters (e.g., reduce an interest rate, or the like) indicated in previous loan information to generate the second loan information. As an example, the system may request loan information from a different lender. The system may determine, using the machine learning model, a third value indicative of a probability that the customer will purchase the vehicle and the product or service based on the second loan information. The system may compare the third value with the probability threshold. This process may be repeated until an interest rate having a value exceeding the probability threshold is determined. Examples are further described in FIG. 8.

Referring back to block 714, if the first value exceeds the probability threshold, the system may determine that the customer is most likely to accept the loan information to purchase the vehicle and the product or service, and then the system may perform actions in block 718.

At block 718, the system may compare the second value with a profitability threshold. The profitability threshold may indicate a threshold value or range for determining whether or not the product or service being profitable based on loan information. If the second value does not exceed the profitability threshold, the system may determine that the vehicle and the product or services are less likely to produce an acceptable profit, and then the system may perform actions in block 716. At block 716, the system may determine second loan information associated with the customer identifier and the vehicle. The system may determine fourth value indicative of a profitability of a purchase of the vehicle and the product or service based on the second loan information. The system may compare the fourth value with the profitability threshold. This process may be repeated until loan information having a value exceeding the profitability threshold is determined. If the second value exceeds the profitability threshold, the system may determine that the vehicle and the product or services are most likely to produce an acceptable profit (e.g., equal to or greater than a profit goal), and then the system may perform actions in block 720. In some embodiments, the system may repeat actions in the block 714 and 718 until loan information having a value exceeding the probability threshold and a value exceeding the profitability threshold is determined.

At block 720, the system may send, based on the first value and the second value, a first indication of the vehicle, a second indication of the product or service, and a third indication of the loan information to a second device for presentation. In some embodiments, the system may send the first indication, the second indication, and the third indication is based on the determination that the first value exceeds the probability threshold, and the second value exceeds the profitability threshold. For example, when the profitability of the vehicle based on a transaction using the loan information exceeds a profitability threshold, and a probability exceeds the probability threshold, the loan information may be determined to be sufficiently profitable to offer to the customer, and the customer is most likely to accept to make a purchase, the system may send the loan information for presentation to the customer. The system may use one or more graphical user interfaces to display the vehicle, the product or service, and loan information.

Figure 8:
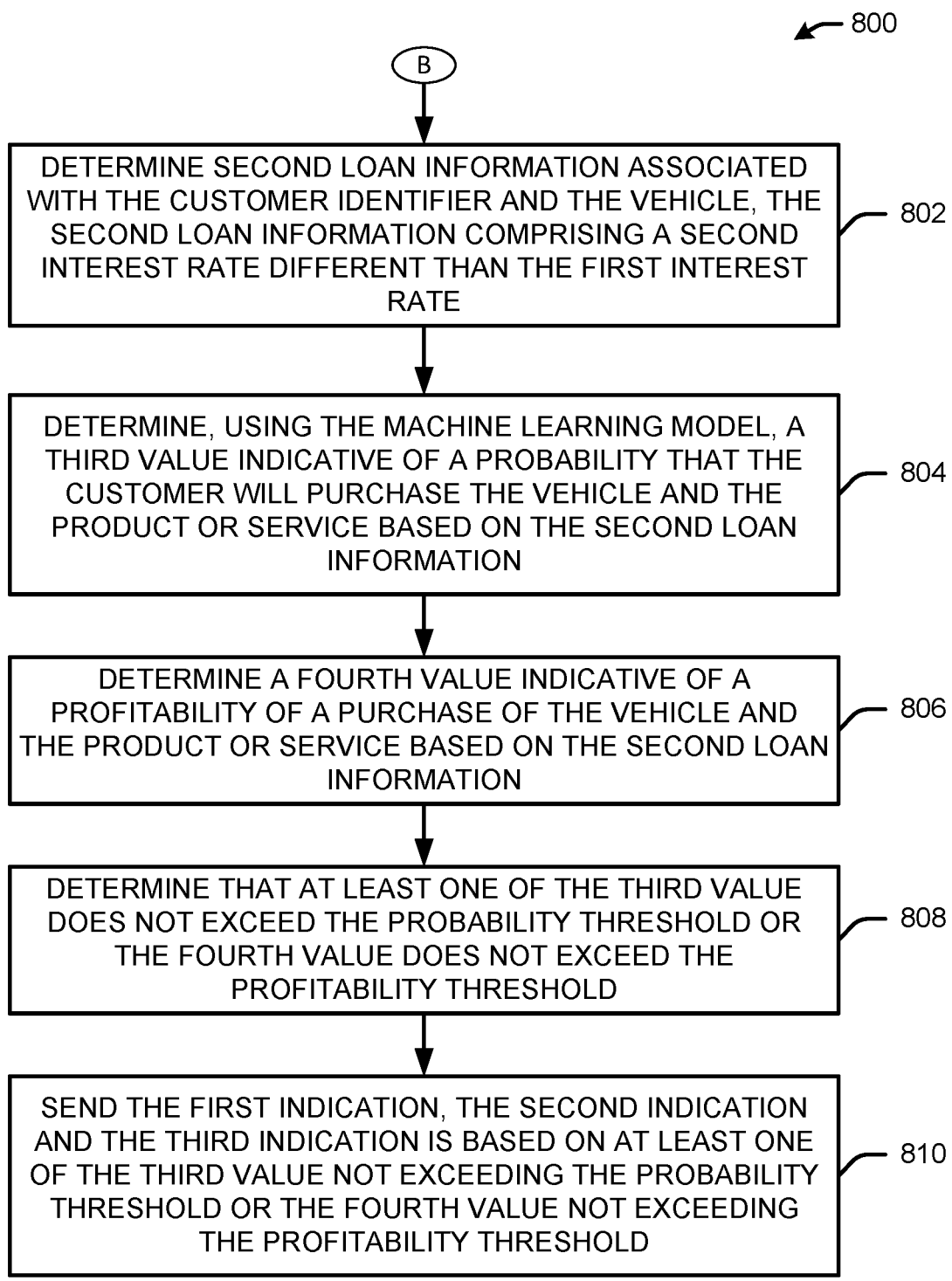
FIG. 8 illustrates an example flow diagram showing a process for selecting and recommending loans, in accordance with one or more example embodiments of the present disclosure.

FIG. 8 illustrates an example flow diagram showing a process 800 for selecting and recommending loans, in accordance with one or more example embodiments of the present disclosure. As illustrated, the process WO may continue from block B of FIG. 7.

At block 802, a system (e.g., the one or more servers 105 of FIG. 1, the one or more service provider computer(s) 210 of FIG. 2) may determine second loan information associated with the customer identifier and the vehicle. The second loan information may include a second interest rate different than a first interest rate determined in the block 706.

Examples for determining second loan information are described with respect to block 716 in FIG. 7.

At block 804, the system may determine, using the machine learning model, a third value indicative of a probability that the customer will purchase the vehicle and the product or service based on the second loan information. For example, the system may utilize a machine—learned model to determine the third value based on the second loan information that was considered for other similar vehicles, and/or for similar customers.

At block 806, the system may determine a fourth value indicative of a profitability of a purchase of the vehicle and the product or service based on the second loan information. For example, the system may use the machine learning model to further determine the fourth value based on the second loan information that was considered for other similar vehicles and/or for similar customers. As another example, the system may use the machine learning model to further determine the fourth value based on the second loan information, a first weight for the financial data, and a second weight for the vehicle data, as described with respect to FIG. 3.

At block 808, the system may determine that at least one of the third value does not exceed the probability threshold or the fourth value does not exceed the profitability threshold. For example, the system may compare the third value with the probability threshold and compare the fourth value with the profitability threshold. The system may determine that the third value does not exceed the probability threshold, the fourth value does not exceed the profitability threshold, or both the third value does not exceed the probability threshold and the fourth value does not exceed the profitability threshold.

At block 810, the system may send the first indication, the second indication, and the third indication is based on at least one of the third value not exceeding the probability threshold or the fourth value not exceeding the profitability threshold. For example, the system may compare that first loan information in the block 706 with the second loan information. The system may select the first loan information have the first value exceeding the probability threshold and the second value exceeding the profitability threshold for presentation.

Figure 9:
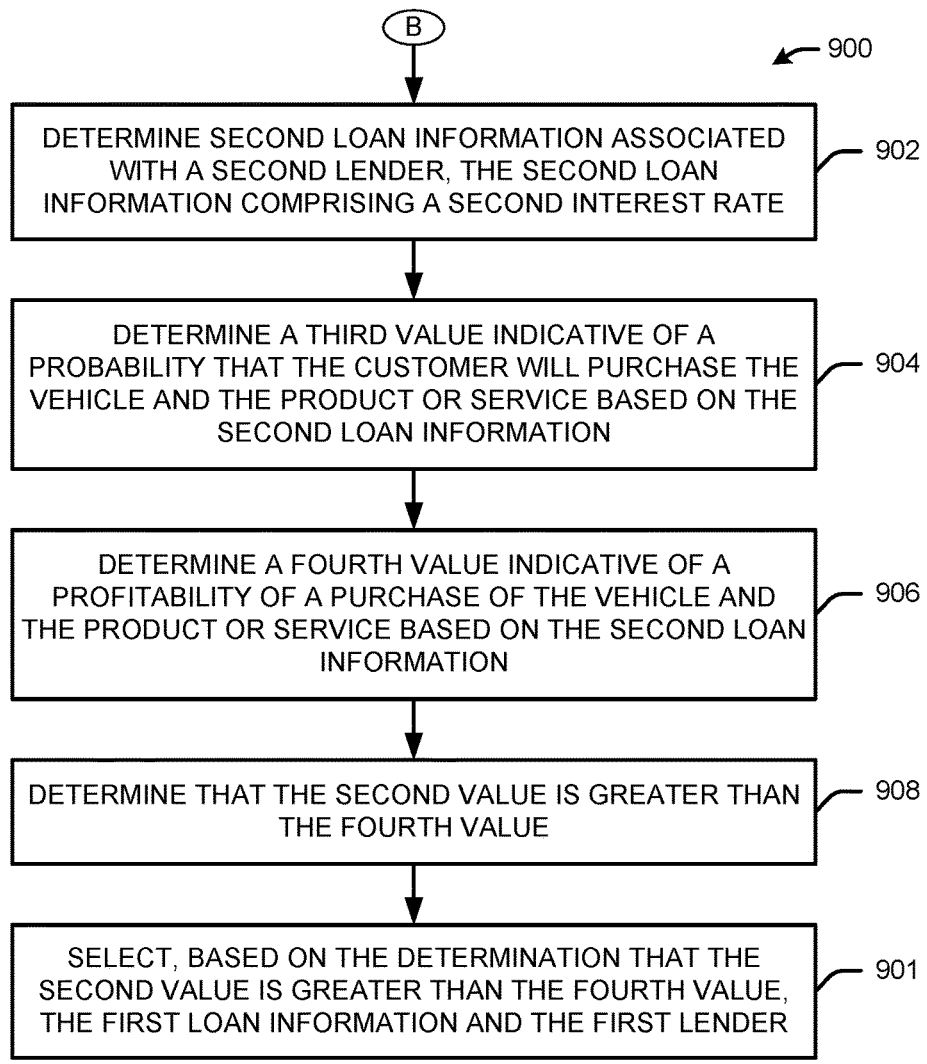
FIG. 9 illustrates an example flow diagram showing a process for selecting and recommending one or more lenders, in accordance with one or more example embodiments of the present disclosure.

FIG. 9 illustrates an example flow diagram showing a process 900 for selecting and recommend one or more lenders, in accordance with one or more example embodiments of the present disclosure. As illustrated, the process 900 may continue from block B of FIG. 7.

At block 902, a system (e.g., the one or more servers 105 of FIG. 1, the one or more service provider computer(s) 210 of FIG. 2) may determine second loan information associated with a second lender, and the second loan information may include a second interest rate. For example, the system may receive two or more loan information associated with purchasing the vehicle from two or more lenders (e.g., different lenders may approve different loan terms, different interest rates, or the like).

At block 904, the system may determine a third value indicative of a probability that the customer will purchase the vehicle and the product or service based on the second loan information. For example, the system may utilize a machine-learned model to determine the third value based on the second loan information that was considered for other similar vehicles, and/or for similar customers.

At block 906, the system may determine a fourth value indicative of a profitability of a purchase of the vehicle and the product or service based on the second loan information. For example, the system may use the machine learning model to further determine the fourth value based on the second loan information that was considered for other similar vehicles, and/or for similar customers. As another example, the system may use the machine learning model to further determine the fourth value based on the second loan information, a first weight for the financial data, and a second weight for the vehicle data, as described with respect to FIG. 3.

At block 908, the system may determine that the second value is greater than the fourth value. For example, the system may compare the second value determined in the block 712 and the fourth value. The second value is greater than the fourth value, indicating that a first lender who approves a first interest rate indicated in the block 706 that is most likely resulting in a higher profit than the second interest rate provided by the second lender.

At block 910, the system may select, based on the determination that the second value is greater than the fourth value, the first loan information, and the first lender. For example, the system may select the first lender who approves the first interest rate that is most likely resulting in a higher profit than the second lender. In some embodiments, the system may select a lender who approves the first interest rate that is also most likely to result in the customer purchasing the vehicle. Alternatively, the system may determine that one interest rate available to the customer is less likely to result in the customer purchasing the vehicle than if another interest rate were presented to the customer. In this manner, the system may consider whether loan information, such as an interest rate, is likely to be profitable, and whether the loan information is likely to result in a purchase or result in the customer walking away.

Figure 10:
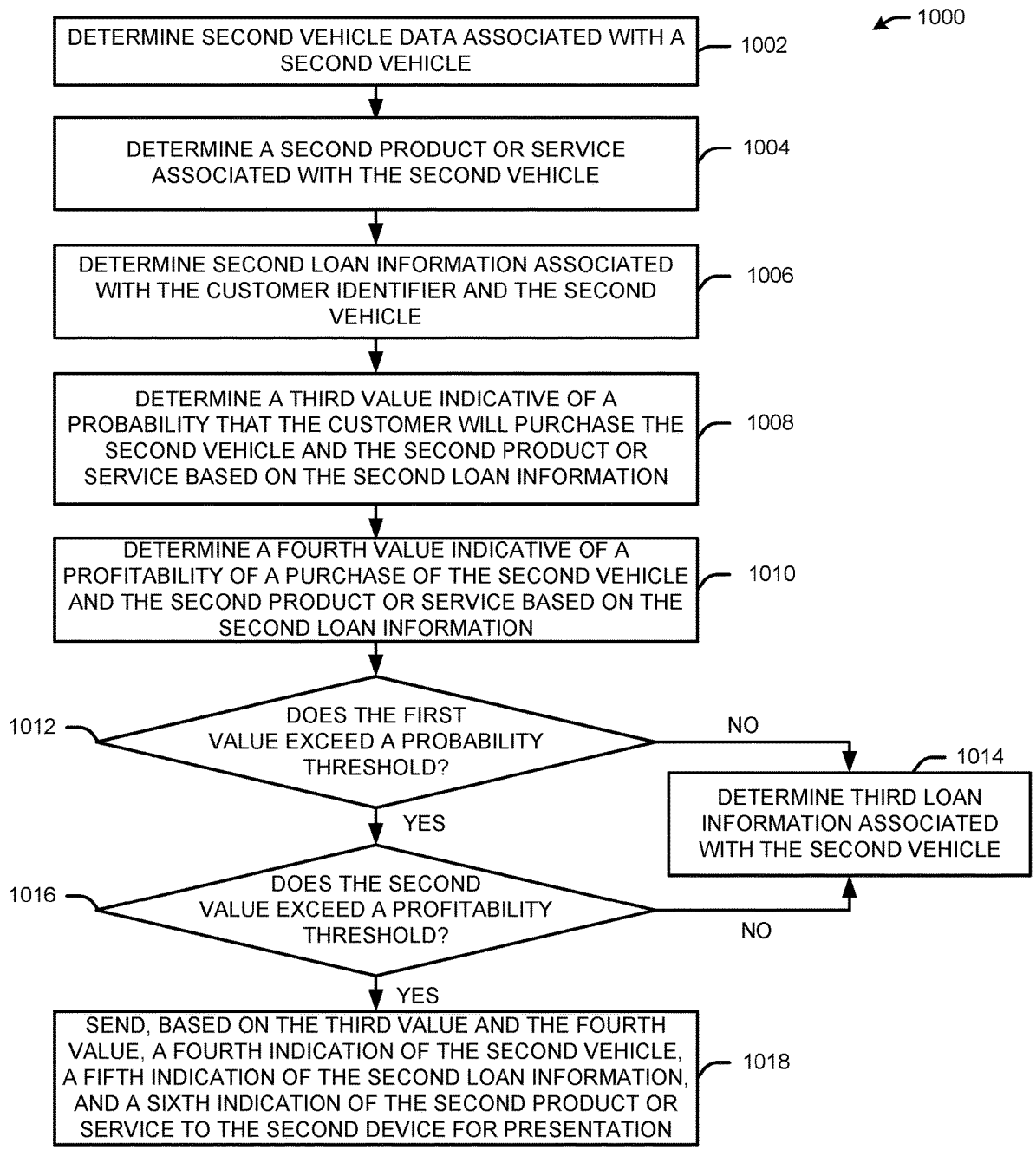
FIG. 10 illustrates an example flow diagram showing a process for recommending product or service, and loan information for two or more vehicles, in accordance with one or more example embodiments of the present disclosure.

FIG. 10 illustrates an example flow diagram showing a process 1000 for recommending product or service and loan information for two or more vehicles, in accordance with one or more example embodiments of the present disclosure.

At block 1002, a system (e.g., the one or more servers 105 of FIG. 1, the one or more service provider computer(s) 210 of FIG. 2) may determine second vehicle data associated with a second vehicle. For example, a customer may be interested in the vehicle indicated in the block 704. The system may also determine vehicle data for one or more similar vehicles and associated products or services and loan information. As an example, a customer may be interested in multiple vehicles. For each vehicle, the system may determine vehicle data associated with that vehicle. In some embodiments, the vehicle data may be from one or more databases of the system. In some embodiments, the system may send a request to a third-party system to retrieve the vehicle data.

At block 1004, the system may determine a second product or service associated with the second vehicle. The second product or service may include product or services for vehicle protection, vehicle accessories, extended warranties, insurance, paint protections, or any suitable product or service associated with the second vehicle. In some embodiments, the second product or service may include the second vehicle. In some embodiments, the system may determine the second product or service based on the second vehicle data, and/or financial data associated with the customer identifier. For example, the system may determine that the second vehicle may have deals for vehicle accessories (e.g., mud flaps, or the like) based on the second vehicle data, including deals and features associated with the deals. The system may recommend mud flaps to the customer. In some embodiments, the system may determine multiple products or services associated with the second vehicle.

At block 1006, the system may determine second loan information associated with the customer identifier and the second vehicle. The loan information may include an interest rate, price of the vehicle, monthly payments, a payment term, one or more credit limits, a loan to value ratio, and/or any suitable information associated with loans for a customer with the customer identifier. For example, the system may determine loan information based on the financial data associated with the customer identifier and the second vehicle data. As another example, based on the customer's financial data, one or more lenders may determine the second loan information with which the customer may be approved to purchase the second vehicle. The system may receive loan information from multiple lenders.

At block 1008, the system may determine, using the machine learning model, a third value indicative of a probability that the customer will purchase the second vehicle and the second product or service based on the second loan information. For example, the system may utilize a machine-learned model to determine the third value based on the second loan information that was considered for other similar vehicles and/or for similar customers. In some embodiments, the system may determine a threshold interest rate based on previous purchases by the same customer for similar vehicles, previous purchases by similar customers for the same vehicle, and/or previous purchases by similar customers for similar vehicle. For example, an interest rate is less than or equal to the threshold interest rate. The system may determine that a customer is most likely to accept the interest rate. As another example, an interest rate is greater than the threshold interest rate. The system may determine that a customer is less likely to accept the interest rate. The system may adjust an interest rate to be less than or equal to the threshold interest rate.

At block 1010, the system may determine a fourth value indicative of a profitability of a purchase of the second vehicle and the second product or service based on the second loan information. The fourth value indicative of the second vehicle's profitability may be an indication of how profitable a purchase of the second vehicle may be when purchased according to the second loan information. For example, a higher interest rate of the second loan information may result in a more profitable transaction. A longer payment period may result in more interest paid over time, and therefore a more profitable transaction. For example, in some embodiments, the system may use the machine learning model to further determine the fourth value based on the second loan information that was considered for other similar vehicles, and/or for similar customers. As another example, the system may use the machine learning model to further determine the fourth value based on the second loan information, a first weight for the financial data, and a second weight for the vehicle data, as described with respect to FIG. 3.

At block 1012, the system may compare the third value with a probability threshold. The probability threshold may indicate a threshold value or range for determining whether or not a customer will accept the second loan information to purchase the second vehicle and the second product or service. If the third value does not exceed the probability threshold, the system may determine that the customer is less likely to accept the second loan information to purchase the second vehicle, and the second product or service, and then the system may perform actions in block 1014.

At block 1014, the system may determine third loan information associated with the customer identifier and the second vehicle. For example, the system may adjust one or more parameters (e.g., reduce an interest rate, or the like) indicated in the second loan information to generate the third loan information. As an example, the system may request loan information from a different lender. The system may determine, using the machine learning model, a fifth value indicative of a probability that the customer will purchase the second vehicle and the second product or service based on the third loan information. The system may compare the fifth value with the probability threshold. This process may be repeated until loan information having a value exceeding the probability threshold is determined. Examples are further described in FIG. 8.

Referring back to block 1012, if the third value exceeds the probability threshold, the system may determine that the customer is most likely to accept the second loan information to purchase the second vehicle and the second product or service, and then the system may perform actions in block 1016.

At block 1016, the system may compare the fourth value with a profitability threshold. The profitability threshold may indicate a threshold value or range for determining whether or not the product or service being profitable based on loan information. If the fourth value does not exceed the profitability threshold, the system may determine that the second vehicle and the second product or services are less likely to produce an acceptable profit, and then the system may perform actions in block 1014. At block 1014, the system may determine third loan information associated with the customer identifier and the second vehicle. The system may determine a fifth value indicative of a profitability of a purchase of the second vehicle and the second product or service based on the second loan information. The system may compare the fifth value with the profitability threshold. This process may be repeated until loan information having a value exceeding the profitability threshold is determined. If the fifth value exceeds the profitability threshold, the system may determine that the second vehicle and the second product or services are most likely to produce an acceptable profit (e.g., equal to or greater than a profit goal), and then the system may perform actions in block 1018. In some embodiments, the system may repeat actions in the block 1012 and 1016 until loan information having a value exceeding the probability threshold and a value exceeding the profitability threshold is determined.

At block 1018, the system may send, based on the third value and the fourth value, a fourth indication of the second vehicle, a fifth indication of the second product or service, and a sixth indication of the second loan information to the second device for presentation. In some embodiments, the system may send the fourth indication, the fifth indication, and the sixth indication is based on the determination that the third value exceeds the probability threshold, and the fourth value exceeds the profitability threshold. For example, when the profitability of the second vehicle based on a transaction using the second loan information exceeds the profitability threshold, and a probability exceeds the probability threshold, the second loan information may be determined to be sufficiently profitable to offer to the customer, and the customer is most likely to accept to make a purchase, the system may send the second loan information for presentation to the customer. The system may use one or more graphical user interfaces to display the second vehicle, the second product or service, and the second loan information.

Figure 11:
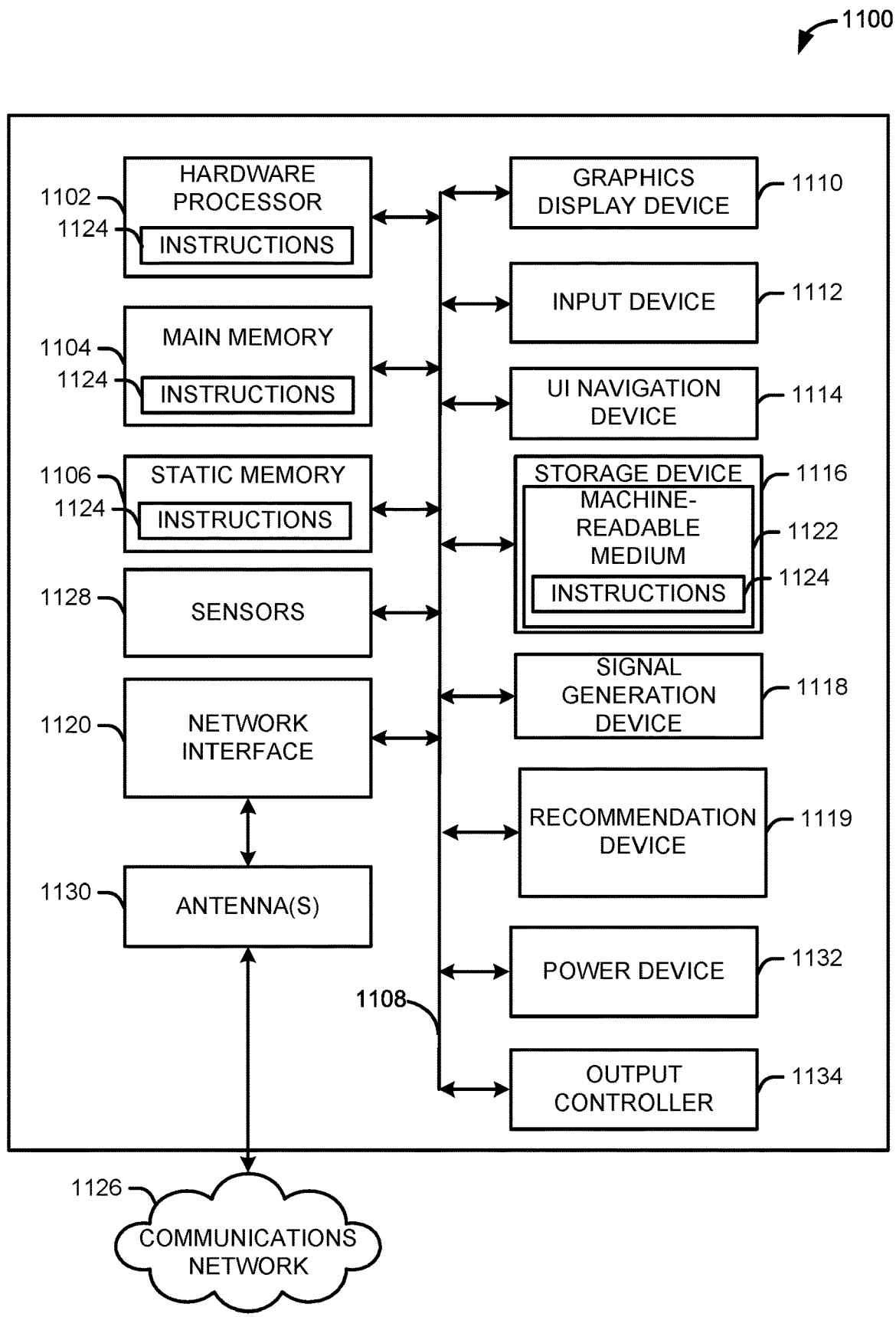
FIG. 11 illustrates a block diagram of an example of a machine, in accordance with one or more example embodiments of the present disclosure.

FIG. 11 illustrates a block diagram of an example of a machine 1100 (e.g., the one or more servers 105 of FIG. 1, the one or more service provider computer(s) 210 of FIG. 2) or system upon which any one or more of the techniques (e.g., methodologies) discussed herein may be performed. In other embodiments, the machine 1100 may operate as a standalone device or may be connected (e.g., networked) to other machines. In a networked deployment, the machine 1100 may operate in the capacity of a server machine, a client machine, or both in server-client network environments. In an example, the machine 1100 may act as a peer machine in Wi-Fi direct, peer-to-peer (P2P) (or other distributed) network environments. The machine 1100 may be a server, a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 1100 may include a hardware processor 1102 (e.g., a central processing unit (CPU), a graphics processing unit (GPU), a hardware processor core, or any combination thereof), a main memory 1104 and a static memory 1106, some or all of which may communicate with each other via an interlink (e.g., bus) 1108. The machine 1100 may further include a power management device 1132, a graphics display device 1110, an alphanumeric input device 1112 (e.g., a keyboard), and a user interface (UI) navigation device 1114 (e.g., a mouse). In an example, the graphics display device 1110, alphanumeric input device 1112, and UI navigation device 1114 may be a touch screen display. The machine 1100 may additionally include a storage device (i.e., drive unit) 1116, a signal generation device 1118 (e.g., an emitter, a speaker), a recommendation device 1119, a network interface device/transceiver 1120 coupled to antenna(s) 1130, and one or more sensors 1128, such as a global positioning system (GPS) sensor, a compass, an accelerometer, or other sensor. The machine 1100 may include an output controller 1134, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)).

The storage device 1116 may include a machine-readable medium 1122 on which is stored one or more sets of data structures or instructions 1124 (e.g., software) embodying or utilized by any one or more of the techniques or functions described herein. The instructions 1124 may also reside, completely or at least partially, within the main memory 1104, within the static memory 1106, or within the hardware processor 1102 during execution thereof by the machine 1100. In an example, one or any combination of the hardware processor 1102, the main memory 1104, the static memory 1106, or the storage device 1116 may constitute machine-readable media.

The recommendation device 1119 may carry out or perform any of the operations and processes (e.g., process 300 of FIG. 3, process 400 of FIG. 4, process 500 of FIG. 5, process 600 of FIG. 6, process 700 of FIG. 7, process 800 of FIG. 8, process 900 of FIG. 9, process 1000 of FIG. 10) described above. The recommendation device 1119 may be included in a server 104 of FIG. 1 or a service provider computer 210 of FIG. 2. For example, the recommendation device may include or otherwise be in communication with at least the model module 246, the recommendation module 248, and the feedback module 251.

While the machine-readable medium 1122 is illustrated as a single medium, the term "machine-readable medium" may include a single medium, or multiple media (e.g., a centralized or distributed database, and/or associated caches and servers) configured to store the one or more instructions 1124.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as, but not limited to source code, compiled code, interpreted code, executable code, static code, dynamic code, and the like. Such a computer-readable medium may include any tangible non-transitory medium for storing information in a form readable by one or more computers, such as but not limited to read-only memory (ROM); random access memory (RAM); magnetic disk storage media; optical storage media; a flash memory, etc.

The term "machine-readable medium" may include any medium that is capable of storing, encoding, or carrying instructions for execution by the machine 1100 and that cause the machine 1100 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)), and flash memory devices; magnetic disks, such as internal hard disks and removable disks; magneto-optical disks; and CD-ROM and DVD-ROM disks.

The instructions 1124 may further be transmitted or received over a communications network 1126 using a transmission medium via the network interface device/transceiver 1120 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 1120 may include one or more physical jacks (e.g., Ethernet, coaxial, or phone jacks) or one or more antennas to connect to the communications network 1126. In an example, the network interface device/transceiver 1120 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 1100 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth-generation (5G) mobile networks, 3GPP, long term evolution (LTE), LTE advanced, enhanced data rates for GSM Evolution (EDGE), or the like. Other embodiments may be used in various other devices, systems, and/or networks.

It is understood that the above descriptions are for purposes of illustration and are not meant to be limiting.

Although specific embodiments of the disclosure have been described, numerous other modifications and alternative embodiments are within the scope of the disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed:

1. A method comprising:
    receiving, by a device comprising at least one processor, a customer identifier associated with a customer;
    determining, by the device, financial data associated with the customer identifier and vehicle data associated with a vehicle;
    determining, by the device, loan information associated with the customer identifier and the vehicle, the loan information comprising an interest rate;
    determining, by the device, a product or service associated with the vehicle;
    determining, by the device, using a machine learning model, a first value indicative of a probability that the customer will purchase the vehicle and the product or service based on the loan information;
    determining, by the device, a second value indicative of a profitability of a purchase of the vehicle and the product or service based on the loan information; and
    sending, by the device, based on the first value and the second value, a first indication of the vehicle, a second indication of the product or service, and a third indication of the loan information to a second device for presentation.

2. The method of claim 1, further comprising:
    determining, by the device, that the first value exceeds a probability threshold; and
    determining, by the device, that the second value exceeds a profitability threshold;
    wherein sending the first indication, the second indication and the third indication is based on the determination that the first value exceeds the probability threshold and the second value exceeds the profitability threshold.

3. The method of claim 2, wherein determining that the second value exceeds the profitability threshold based at least in part on an original equipment manufacturer (OEM) incentive.

4. The method of claim 1, wherein the loan information is first loan information and the interest rate is a first interest rate, further comprising:
    determining, by the device, second loan information associated with the customer identifier and the vehicle, the second loan information comprising a second interest rate different than the first interest rate;
    determining, by the device, using the machine learning model, a third value indicative of a probability that the customer will purchase the vehicle and the product or service based on the second loan information;
    determining, by the device, a fourth value indicative of a profitability of a purchase of the vehicle and the product or service based on the second loan information; and
    determining at least one of the third value does not exceed a probability threshold or the fourth value does not exceed a profitability threshold,
    wherein sending the first indication, the second indication, and the third indication is based on at least one of the third value not exceeding the probability threshold or the fourth value not exceeding the profitability threshold.

5. The method of claim 1, wherein the vehicle is a first vehicle, the vehicle data is associated with the first vehicle, the product or service is a first product or service, and the loan information is first loan information, the method further comprising:
    determining, by the device, second vehicle data associated with a second vehicle;
    determining, by the device, a second product or service associated with the second vehicle;
    determining, by the device, second loan information associated with the customer identifier and the second vehicle;
    determining, by the device a third value indicative of a probability that the customer will purchase the second vehicle and the second product or service based on the second loan information;
    determining, by the device, a fourth value indicative of a profitability of a purchase of the second vehicle and the second product or service based on the second loan information; and
    sending, by the device, based on the third value and the fourth value, a fourth indication of the second vehicle, a fifth indication of the second loan information, and a sixth indication of the second product or service to the second device for presentation.

6. The method of claim 1, wherein the interest rate is a first interest rate associated with the vehicle, further comprising:
    determining, by the device, that the customer is approved to purchase the vehicle based on a second interest rate;
    determining, by the device, based on the second interest rate, the first interest rate, the first interest rate higher than the second interest rate;
    determining that the first value exceeds a probability threshold; and
    selecting, by the device, the first interest rate for the loan information.

7. The method of claim 1, wherein the loan information is first loan information associated with a first lender, and the interest rate is a first interest rate, the method further comprising:
    determining, by the device, second loan information associated with a second lender, the second loan information comprising a second interest rate;

determining, by the device, a third value indicative of a probability that the customer will purchase the vehicle and the product or service based on the second loan information;

determining, by the device, a fourth value indicative of a profitability of a purchase of the vehicle and the product or service based on the second loan information;

determining, by the device, that the second value is greater than the fourth value; and selecting, by the device, based on the determination that the second value is greater than the fourth value, the first loan information, and the first lender, wherein the third indication comprises the first lender.

8. The method of claim 1, wherein the product or service is a first product or service, the method further comprising:

determining, by the device, a second product or service associated with the vehicle;

determining, by the device, a third value indicative of a probability that the customer will purchase the vehicle and the second product or service based on the loan information;

determining, by the device, that the first value exceeds a probability threshold; and determining, by the device, that the third value fails to exceed the probability threshold;

wherein sending the second indication of the first product or service is based on the determination that the third value does not exceed a probability threshold.

9. The method of claim 1, wherein the interest rate is a first interest rate, and the vehicle is a first vehicle, and wherein determining, using the machine learning model, the first value comprises:

determining, by the device, data associated with loan information for additional vehicles;

determining, by the device, based on the data, a second loan information associated with a second vehicle, and third loan information associated with a third vehicle, the second loan information comprising a second interest rate, and the third loan information comprising a third interest rate;

determining, by the device, that the second loan information was associated with a purchase of the second vehicle;

determining, by the device, an absence of a purchase of the third vehicle based on the third loan information;

determining, by the device, based on the purchase of the second vehicle and the absence of the purchase of the third vehicle, a threshold interest rate; and determining that the first interest rate is less than the threshold interest rate, wherein determining, using the machine learning model, the first value is based on the first interest rate being less than the threshold interest rate.

10. The method of claim 1, further comprising:

determining, by the device, a probability that one or more lenders will approve the loan information;

determining, by the device, that the probability exceeds a probability threshold;

sending, by the device, the loan information to the one or more lenders; and receiving, by the device, an indication that the one or more lenders have approved the loan information.

11. The method of claim 1, wherein determining the loan information comprises:

identifying, by the device, one or more estimates associated with a value of the vehicle; and determining, by the device, based on the one or more estimates, the loan information.

12. A system comprising memory coupled to at least one processor, the at least one processor configured to:

receive a customer identifier associated with a customer;

determine financial data associated with the customer identifier and vehicle data associated with a vehicle;

determine loan information associated with the customer identifier and the vehicle, the loan information comprising an interest rate;

determine a product or service associated with the vehicle;

determine, using a machine learning model, a first value indicative of a probability that the customer will purchase the vehicle and the product or service based on the loan information;

determine a second value indicative of a profitability of a purchase of the vehicle and the product or service based on the loan information; and send, based on the first value and the second value, a first indication of the vehicle, a second indication of the product or service, and a third indication of the loan information to a second device for presentation.

13. The system of claim 12, wherein the at least one processor is further configured to:

determine that the first value exceeds a probability threshold; and determine that the second value exceeds a profitability threshold;

wherein sending the first indication, the second indication, and the third indication is based on the determination that the first value exceeds the probability threshold and the second value exceeds the profitability threshold.

14. The system of claim 12, wherein the loan information is first loan information, and the interest rate is a first interest rate, wherein the at least one processor is further configured to:

determine second loan information associated with the customer identifier and the vehicle, the second loan information comprising a second interest rate different than the first interest rate;

determine, using the machine learning model, a third value indicative of a probability that the customer will purchase the vehicle and the product or service based on the second loan information;

determine a fourth value indicative of a profitability of a purchase of the vehicle and the product or service based on the second loan information; and determine that at least one of the third value does not exceed a probability threshold or the fourth value does not exceed a profitability threshold, wherein sending the first indication, the second indication, and the third indication is based on at least one of the third value not exceeding the probability threshold or the fourth value not exceeding the profitability threshold.

15. The system of claim 12, wherein the vehicle is a first vehicle, the vehicle data is associated with the first vehicle, the product or service is a first product or service, and the loan information is first loan information, and wherein the at least one processor is further configured to:

determine second vehicle data associated with a second vehicle;

determine a second product or service associated with the second vehicle;

determine second loan information associated with the customer identifier and the second vehicle;

determine a third value indicative of a probability that the customer will purchase the second vehicle and the second product or service based on the second loan information;

determine a fourth value indicative of a profitability of a purchase of the second vehicle and the second product or service based on the second loan information; and send, based on the third value and the fourth value, a fourth indication of the second vehicle, a fifth indication of the second loan information, and a sixth indication of the second product or service to the second device for presentation.

16. The system of claim 11, wherein the interest rate is a first interest rate associated with the vehicle, wherein the at least one processor is further configured to:

determine that the customer is approved to purchase the vehicle based on a second interest rate;

determine, based on the second interest rate, the first interest rate, the first interest rate higher than the second interest rate;

determine that the first value exceeds a probability threshold; and select the first interest rate for the loan information.

17. The system of claim 12, wherein the loan information is first loan information associated with a first lender, and the interest rate is a first interest rate, wherein the at least one processor is further configured to:

determine second loan information associated with a second lender, the second loan information comprising a second interest rate;

determine a third value indicative of a probability that the customer will purchase the vehicle and the product or service based on the second loan information;

determine a fourth value indicative of a profitability of a purchase of the vehicle and the product or service based on the second loan information;

determine that the second value is greater than the fourth value; and select, based on the determination that the second value is greater than the fourth value, the first loan information and the first lender, wherein the third indication comprises the first lender.

18. The system of claim 12, wherein the product or service is a first product or service, wherein the at least one processor is further configured to:

determine a second product or service associated with the vehicle;

determine a third value indicative of a probability that the customer will purchase the vehicle and the second product or service based on the loan information;

determine that the first value exceeds a probability threshold; and determine that the third value fails to exceed the probability threshold;

wherein sending the second indication of the first product or service is based on the determination that the third value does not exceed a probability threshold.

19. A device comprising memory coupled to at least one processor, the at least one processor configured to:

receive a customer identifier associated with a customer;

determine financial data associated with the customer identifier and vehicle data associated with a vehicle;

determine loan information associated with the customer identifier and the vehicle, the loan information comprising an interest rate;

determine a product or service associated with the vehicle;

determine, using a machine learning model, a first value indicative of a probability that the customer will purchase the vehicle and the product or service based on the loan information;

determine a second value indicative of a profitability of a purchase of the vehicle and the product or service based on the loan information; and send, based on the first value and the second value, a first indication of the vehicle, a second indication of the product or service, and a third indication of the loan information to a second device for presentation.

20. The device of claim 19, wherein the at least one processor is further configured to:

determine that the first value exceeds a probability threshold; and determine that the second value exceeds a profitability threshold;

wherein sending the first indication, the second indication and the third indication is based on the determination that the first value exceeds the probability threshold and the second value exceeds the profitability threshold.

* * * * *